US007340608B2

(12) United States Patent
Laurie et al.

(10) Patent No.: US 7,340,608 B2
(45) Date of Patent: Mar. 4, 2008

(54) SYSTEM AND METHOD FOR CREATING, VAULTING, TRANSFERRING AND CONTROLLING TRANSFERABLE ELECTRONIC RECORDS WITH UNIQUE OWNERSHIP

(75) Inventors: Michael Laurie, Pierrefonds (CA); Robert Al-Jaar, Pierrefonds (CA); Oleksiy Savchenko, Montreal (CA)

(73) Assignee: Silanis Technology Inc., St. Laurent, Quebec (CA)

( * ) Notice: Subject to any disclaimer, the term of this patent is extended or adjusted under 35 U.S.C. 154(b) by 679 days.

(21) Appl. No.: 10/463,646

(22) Filed: Jun. 17, 2003

(65) Prior Publication Data

US 2004/0111619 A1 Jun. 10, 2004

Related U.S. Application Data

(60) Provisional application No. 60/388,741, filed on Jun. 17, 2002.

(51) Int. Cl.
*H04L 9/00* (2006.01)

(52) U.S. Cl. ...................... 713/176; 713/175; 713/181; 713/193; 705/75; 705/76

(58) Field of Classification Search ................ 713/176, 713/175, 193, 181; 705/76, 75
See application file for complete search history.

(56) References Cited

U.S. PATENT DOCUMENTS 5,615,268 A 3/1997 Bisbee et al. ................. 380/25
5,748,738 A 5/1998 Bisbee et al. ................. 380/25
6,039,248 A * 3/2000 Park et al. .................. 235/379
6,237,096 B1 5/2001 Bisbee et al. ............... 713/178
6,367,013 B1 4/2002 Bisbee et al. ............... 713/178
7,051,364 B1 * 5/2006 Tackman et al. ............... 726/3
2002/0128940 A1 9/2002 Orrin et al. .................... 705/35
2003/0078880 A1 * 4/2003 Alley et al. .................... 705/38
2003/0093679 A1 * 5/2003 Hawkins et al. ............ 713/181

FOREIGN PATENT DOCUMENTS

WO WO0055774 9/2000
WO WO0113574 2/2001
WO WO0144966 6/2001

* cited by examiner

*Primary Examiner*—Gilberto Barron
*Assistant Examiner*—Samson Lemma
(74) *Attorney, Agent, or Firm*—Merchant & Gould P.C.

(57) ABSTRACT

A system for securely vaulting, auditing, controlling and transferring electronic transferable records (TRs) with unique ownership, including at least one registry for registering the electronic transferable record with unique ownership in a TR registry record; at least one secure storage manager (SSM) associated with the registry, the SSM storing the transferable record registered in the registry as an authoritative copy, the secure storage manager being distinct from said registry. The transferable record can be transferred in a transaction between an originating party and a receiving party with a transaction descriptor including information about the parties involved in the transaction and an identification of the TR being transferred. The transaction descriptor is initially signed by the originating party with the TR, subsequently verified and countersigned by the registry and signed by said accepting party. The transaction descriptor, upon completion of the transaction, is stored in the TR registry record and serves to identify the authoritative copy of the TR.

17 Claims, 8 Drawing Sheets

SYSTEM AND METHOD FOR CREATING, VAULTING, TRANSFERRING AND CONTROLLING TRANSFERABLE ELECTRONIC RECORDS WITH UNIQUE OWNERSHIP

FIELD OF THE INVENTION

The present invention is directed to a system and method for creating, vaulting, transferring, and controlling transferable electronic records with unique ownership, such as chattel paper, notes, documents of title, and promissory notes.

DESCRIPTION OF THE PRIOR ART

The application of information technology in many industries over the past twenty years resulted in major improvements in cost reduction, operational efficiencies, customer service, and revenue generation. These benefits did not generally extend to certain key sectors in the finance and commerce industries such as home mortgages, auto financing, and equipment lending. This led to the enactment of laws that extended legal rights to electronic forms of financial and commercial records such as chattel paper, notes, and documents of title. It is expected that the removal of barriers to the adoption of electronic commerce in these industries will result in significant business benefits once archaic paper-based business processes are replaced with fully automated business information solutions that are based on Transferable Records Management Systems (TRMS). Some of these benefits include:

- Reduced cost structures due to the use of electronic documents instead of paper documents.
- Increased customer satisfaction due to shorter processing times of customer requests.
- Added revenue potential due to better customer-facing and internal processes.
- Improved overall operational efficiencies and quality of service.
- Reduced risk levels due to the use of secure electronic signature and digital certificate technologies.
- Expanded partnering opportunities with leading technology vendors in the lending market.

Legal Requirements

There are three primary laws that define the legal requirements for controlling ownership, rights, and obligations in financial and commercial transactions in the United States: the revised Article 9, Section 105 of the Uniform Commercial Code (UCC 9-105), Section 16 of the Uniform Electronic Transactions Act (UETA), and Title II of the Electronic Signatures in Global and National Commerce Act (E-SIGN). UCC 9-105 is a federal law that was enacted in 1998 and took effect on Jul. 1, 2001. UETA is a uniform state law that was approved for enactment in July 1999. E-SIGN is a federal law that was enacted on Jun. 30, 2000.

The legal requirements as mandated in UCC 9-105, UETA Section 16, and E-SIGN Title II describe how to handle and maintain control over transferable electronic records such as electronic chattel paper and mortgage notes. Precise definitions of these terms are provided below. UCC 9-105 introduced the concept of an electronic chattel paper and set legal requirements for the control of electronic chattel paper including its assignment, in electronic form, from one party to another. UETA Section 16, referencing similar language and concepts as UCC 9-105, introduced a similar but limited concept of transferable records as electronic records that are equivalent to either paper promissory notes (i.e. negotiable instruments) or paper documents of title. E-SIGN Title II, referencing transferable records under UETA Section 16, narrowed the scope of transferable records to promissory notes that are secured by real property and allowed for the use of electronic signatures to execute such transferable records.

FIG. 1 summarizes the interrelationships among the key legal terms used in the present application. Transferable records are depicted as just one type of electronic chattel paper. UETA includes promissory notes and documents of title in its definition of transferable records. E-SIGN strictly defines transferable records as promissory notes relating to a loan secured by real property.

Legal definitions and brief overviews of the three laws to aid in the understanding of the requirements and concepts of the present invention are presented below.

The Uniform Commercial Code (UCC)

The following definitions were extracted from the UCC text:

- Record means information that is inscribed on a tangible medium or which is stored in an electronic or other medium and is retrievable in perceivable form.
- Promissory note means an instrument that (i) evidences a promise to pay a monetary obligation, (ii) does not evidence an order to pay, and (iii) does not contain an acknowledgment by a bank that the bank has received for deposit a sum of money or funds.
- Document means a document of title.
- Chattel paper means a record or records that evidence both a monetary obligation and a security interest in or a lease of specific goods or of specific goods and software used in the goods. If a transaction is evidenced both by a security agreement or lease and by an instrument or series of instruments, the group of records taken together constitutes chattel paper.
- Tangible chattel paper means chattel paper evidenced by a record or records consisting of information that is inscribed on a tangible medium.
- Electronic chattel paper means chattel paper evidenced by a record or records consisting of information stored in an electronic medium. Secured party means:
  - (A) a person in whose favor a security interest is created or provided for under a security agreement, whether or not any obligation to be secured is outstanding;
  - (B) a person that holds an agricultural lien;
  - (C) a consignor;
  - (D) a person to which accounts, chattel paper, payment intangibles, or promissory notes have been sold;
  - (E) a trustee, indenture trustee, agent, collateral agent, or other representative in whose favor a security interest or agricultural lien is created or provided for; or
  - (F) a person that holds a security interest.

Overview of Revised UCC 9-105

The National Conference of Commissioners on Uniform State Laws (NCCUSL) revised UCC 9-105 to introduce the concept of an electronic chattel paper and to specify the legal requirements for having control over electronic chattel paper. The concept of having control over an electronic chattel paper is equivalent to the possession of a paper-based negotiable instrument under Article 3 of the UCC. However, since an electronic chattel paper is not "tangible" when compared to a paper chattel paper, UCC 9-105 imposes legal requirements to ensure that control can be asserted over a single "authoritative copy" of an electronic chattel paper. Since electronic records can be easily copied, UCC 9-105 established the legal foundation to ensure that the authoritative copy of an electronic chattel paper can be readily identified and that fraudulent copies cannot be easily transacted.

The legal requirements for electronic chattel paper as defined in UCC 9-105 are as follows:

Section 9-105. Control of Electronic Chattel Paper

A secured party has control of electronic chattel paper if the record or records comprising the chattel paper are created, stored, and assigned in such a manner that:

- (1) a single authoritative copy of the record or records exists which is unique, identifiable and, except as otherwise provided in paragraphs (4), (5) and (6), unalterable;
- (2) the authoritative copy identifies the secured party as the assignee of the record or records;
- (3) the authoritative copy is communicated to and maintained by the secured party or its designated custodian;
- (4) copies or revisions that add or change an identified assignee of the authoritative copy can be made only with the participation of the secured party;
- (5) each copy of the authoritative copy and any copy of a copy is readily identifiable as a copy that is not the authoritative copy; and
- (6) any revision of the authoritative copy is readily identifiable as an authorized or unauthorized revision.

The Uniform Electronic Transactions Act (UETA)

The following definitions were extracted from the UETA text:

- Record means information that is inscribed on a tangible medium or that is stored in an electronic or other medium and is retrievable in perceivable form.
  - Note: The broad definition of record is intended to encompass any and all means of communicating or storing information including electronic records and "writings".
- Electronic record means a record created, generated, sent, communicated, received, or stored by electronic means.
  - Note: Examples of electronic records include information stored on computer disks, facsimiles, e-mail messages, voice mail messages, and audio/video tapes.
- Transferable record means an electronic record that:
  - (1) would be a note under [Article 3 of the Uniform Commercial Code] or a document under [Article 7 of the Uniform Commercial Code] if the electronic record were in writing; and
  - (2) the issuer of the electronic record expressly has agreed is a transferable record.
- Electronic signature means an electronic sound, symbol, or process attached to or logically associated with a record and executed or adopted by a person with the intent to sign the record.

Overview of UETA Section 16

UETA Section 16 introduced the concept of a transferable record and leveraged the legal requirements for controlling an electronic chattel paper as defined UCC 9-105 to specify the legal requirements for having control over a transferable record. However, it restricted the scope of a transferable record to be an electronic record that is either a note under Article 3 of the UCC or a document of title (i.e. title) under Article 7 of the UCC. Hence, transferable records are electronic equivalents only to either paper promissory notes (i.e. negotiable instruments) or paper documents of title. UETA Section 16 also requires the issuer of the electronic record to explicitly agree that such a record is to be treated as a transferable record.

The legal requirements for transferable records as defined in UETA Section 16 are as follows:

Section 16. Transferable Records (a) In this section, "transferable record" means an electronic record that:

- (1) would be a note under [Article 3 of the Uniform Commercial Code] or a document under [Article 7 of the Uniform Commercial Code] if the electronic record were in writing; and
- (2) the issuer of the electronic record expressly has agreed is a transferable record.

(b) A person has control of a transferable record if a system employed for evidencing the transfer of interests in the transferable record reliably establishes that person as the person to which the transferable record was issued or transferred.

(c) A system satisfies subsection (b), and a person is deemed to have control of a transferable record, if the transferable record is created, stored, and assigned in such a manner that:

- (1) a single authoritative copy of the transferable record exists which is unique, identifiable, and, except as otherwise provided in paragraphs (4), (5), and (6), unalterable;
- (2) the authoritative copy identifies the person asserting control as:
  - (A) the person to which the transferable record was issued; or
  - (B) if the authoritative copy indicates that the transferable record has been transferred, the person to which the transferable record was most recently transferred;
- (3) the authoritative copy is communicated to and maintained by the person asserting control or its designated custodian;
- (4) copies or revisions that add or change an identified assignee of the authoritative copy can be made only with the consent of the person asserting control;
- (5) each copy of the authoritative copy and any copy of a copy is readily identifiable as a copy that is not the authoritative copy; and
- (6) any revision of the authoritative copy is readily identifiable as authorized or unauthorized.

(d) Except as otherwise agreed, a person having control of a transferable record is the holder, as defined in [Section 1-201(20) of the Uniform Commercial Code], of the transferable record and has the same rights and defenses as a holder of an equivalent record or writing under [the Uniform Commercial Code], including, if the applicable statutory requirements under [Section 3-302(a), 7-501, or 9-308 of the Uniform Commercial Code] are satisfied, the rights and defenses of a holder in due course, a holder to which a negotiable document of title has been duly negotiated, or a purchaser, respectively. Delivery, possession, and endorsement are not required to obtain or exercise any of the rights under this subsection.

(e) Except as otherwise agreed, an obligor under a transferable record has the same rights and defenses as an equivalent obligor under equivalent records or writings under [the Uniform Commercial Code].

(f) If requested by a person against which enforcement is sought, the person seeking to enforce the transferable record shall provide reasonable proof that the person is in control of the transferable record. Proof may include access to the authoritative copy of the transferable record and related business records sufficient to review the terms of the transferable record and to establish the identity of the person having control of the transferable record.

The Electronic Signatures in Global and National Commerce Act (E-SIGN)

The following definitions were extracted from the E-SIGN text:

Record means information that is inscribed on a tangible medium or that is stored in an electronic or other medium and is retrievable in perceivable form.

Electronic record means a contract or other record created, generated, sent, communicated, received, or stored by electronic means.

Transferable record means an electronic record that (A) would be a note under Article 3 of the Uniform Commercial Code if the electronic record were in writing;

(B) the issuer of the electronic record expressly has agreed is a transferable record; and (C) relates to a loan secured by real property.

Electronic signature means an electronic sound, symbol, or process, attached to or logically associated with a contract or other record and executed or adopted by a person with the intent to sign the record.

Overview of E-SIGN Title II

E-SIGN Title II uses the concept of a transferable record and the legal requirements for controlling a transferable record under UETA Section 16 (which references UCC 9-105) to allow for the legal execution of transferable records using an electronic signature. However, Title II further restricts the scope of a transferable record beyond what was specified in UETA to be an electronic record that is a promissory note secured by real property. Recall that UETA's definition of a transferable record applies to any promissory note (does not have to be secured by real property) and to documents of title. The E-SIGN restriction was added at the request of the mortgage industry in order to eliminate paper promissory notes from the real estate lending process and to accelerate the adoption of electronic commerce in the secondary mortgage market. Consequently, under E-SIGN, a transferable record is the electronic equivalent of a promissory note (i.e. a negotiable instrument under Article 3 of the UCC) that can be transferred and held in electronic form. Following UETA, E-SIGN also requires that the issuer (i.e. borrower) to expressly agree that an electronic record is a valid transferable record. Therefore, E-SIGN does not legally permit the conversion of an existing paper promissory note to an electronic record.

The legal requirements for transferable records as defined in E-SIGN Title II are as follows:

Title II—Transferable Records

SEC. 201. Transferable Records a) DEFINITIONS.—For purposes of this section:

(1) TRANSFERABLE RECORD.—The term "transferable record" means an electronic record that—

(A) would be a note under Article 3 of the Uniform Commercial Code if the electronic record were in writing;

(B) the issuer of the electronic record expressly has agreed is a transferable record; and (C) relates to a loan secured by real property.

A transferable record may be executed using an electronic signature.

(2) OTHER DEFINITIONS.—The terms "electronic record", "electronic signature", and "person" have the same meanings provided in section 106 of this Act.

(b) CONTROL.—A person has control of a transferable record if a system employed for evidencing the transfer of interests in the transferable record reliably establishes that person as the person to which the transferable record was issued or transferred.

(c) CONDITIONS.—A system satisfies subsection (b), and a person is deemed to have control of a transferable record, if the transferable record is created, stored, and assigned in such a manner that (1) a single authoritative copy of the transferable record exists which is unique, identifiable, and, except as otherwise provided in paragraphs (4), (5), and (6), unalterable;

(2) the authoritative copy identifies the person asserting control as (A) the person to which the transferable record was issued; or (B) if the authoritative copy indicates that the transferable record has been transferred, the person to which the transferable record was most recently transferred;

(3) the authoritative copy is communicated to and maintained by the person asserting control or its designated custodian;

(4) copies or revisions that add or change an identified assignee of the authoritative copy can be made only with the consent of the person asserting control;

(5) each copy of the authoritative copy and any copy of a copy is readily identifiable as a copy that is not the authoritative copy; and (6) any revision of the authoritative copy is readily identifiable as authorized or unauthorized.

(d) STATUS AS HOLDER.—Except as otherwise agreed, a person having control of a transferable record is the holder, as defined in section 1-201(20) of the Uniform Commercial Code, of the transferable record and has the same rights and defenses as a holder of an equivalent record or writing under the Uniform Commercial Code, including, if the applicable statutory requirements under section 3-302(a), 9-308, or revised section 9-330 of the Uniform Commercial Code are satisfied, the rights and defenses of a holder in due course or a purchaser, respectively. Delivery, possession, and endorsement are not required to obtain or exercise any of the rights under this subsection.

(e) OBLIGOR RIGHTS.—Except as otherwise agreed, an obligor under a transferable record has the same rights and defenses as an equivalent obligor under equivalent records or writings under the Uniform Commercial Code.

(f) PROOF OF CONTROL.—If requested by a person against which enforcement is sought, the person seeking to enforce the transferable record shall provide reasonable proof that the person is in control of the transferable record. Proof may include access to the authoritative copy of the transferable record and related business records sufficient to review the terms of the transferable record and to establish the identity of the person having control of the transferable record.

(g) UCC REFERENCES.—For purposes of this subsection, all references to the Uniform Commercial Code are to the Uniform Commercial Code as in effect in the jurisdiction the law of which governs the transferable record.

SEC. 202. Effective Date.

This title shall be effective 90 days after the date of enactment of this Act.

Authoritative Copy

The central role that the term "authoritative copy" has in the three laws previously discussed and in the present invention warrants further discussion to ensure clarity. UCC 9-105 introduced the concept of an authoritative copy (AC) of electronic chattel paper (e-chattel). UETA Section 16 and E-SIGN Title II use the concept of the authoritative copy of the transferable record (TR). While none of these laws provided an explicit definition of the term "authoritative copy", they all require that a single authoritative copy be distinguishable from all other copies that may exist. Furthermore, these laws define the notion of "control" over a TR or a TR to be the equivalent of "possession" of tangible chattel paper where the holder is the owner of, and has the rights embodied in, the TR or e-chattel. In other words, the concept of having control over a transferable record or an electronic chattel paper is equivalent to possession of a paper-based or a promissory note or chattel paper.

It should be noted that the above is based on an interpretation of the statutes made by the Applicant, and should not be considered a legal opinion.

In the electronic world, copies of an electronic record are indistinguishable—either there is no "original" or all copies are originals. Therefore, the mere possession of a TR or a TR cannot and does not prove ownership. It is not possible to know how many copies of that TR or e-chattel have been made prior to this possession, nor how many will be made after this possession. Furthermore, these copies are likely to have different owners and ownership chains, resulting in incomplete, conflicting, and erroneous records of ownership. Secure measures and procedures must be in place to establish with certainty that having control over a single, unique, and identifiable authoritative copy of a TR or a TR is tantamount to ownership of the authoritative copy of that TR or e-chattel.

Consequently, there is a need for providing an electronic solution for transferable records which will meet the requirements of the above-mentioned U.S. laws, and other laws which are or may be enacted in other countries.

SUMMARY OF THE INVENTION

It is an object of the present invention to provide a system which enables the electronic transfer of electronic transferable records with unique ownership. In accordance with the invention, this object is achieved with a system for securely vaulting, auditing, controlling and transferring electronic transferable records (TRs) with unique ownership, said electronic transferable record having been created with a secure document creation system, wherein said system comprises:

- at least one registry for registering said electronic transferable record with unique ownership in a TR registry record;
- at least one secure storage manager associated with said registry, said Secure Storage Manager (SSM) storing said transferable record registered in said registry as an authoritative copy, said secure storage manager being distinct from said registry;
- means for registering participants with said system, said participants including said registry, said SSM and a plurality of secured parties, each of said secured parties being represented by at least one representative, each of said participants being provided with an access key pair;
- wherein said transferable record can be transferred in a transaction between an originating party and a receiving party with a transaction descriptor, said transaction descriptor including information about the parties involved in said transaction and an identification of said TR being transferred, said transaction descriptor being initially signed by said originating party with said TR, subsequently verified and countersigned by said registry and signed by said accepting party, said transaction descriptor, upon completion of said transaction, being stored in said TR registry record.

BRIEF DESCRIPTION OF THE DRAWINGS

The present invention will be better understood after reading a description of a preferred embodiment thereof, made with reference to the following drawings in which.

DESCRIPTION OF A PREFERRED EMBODIMENT OF THE INVENTION

Figure 1:
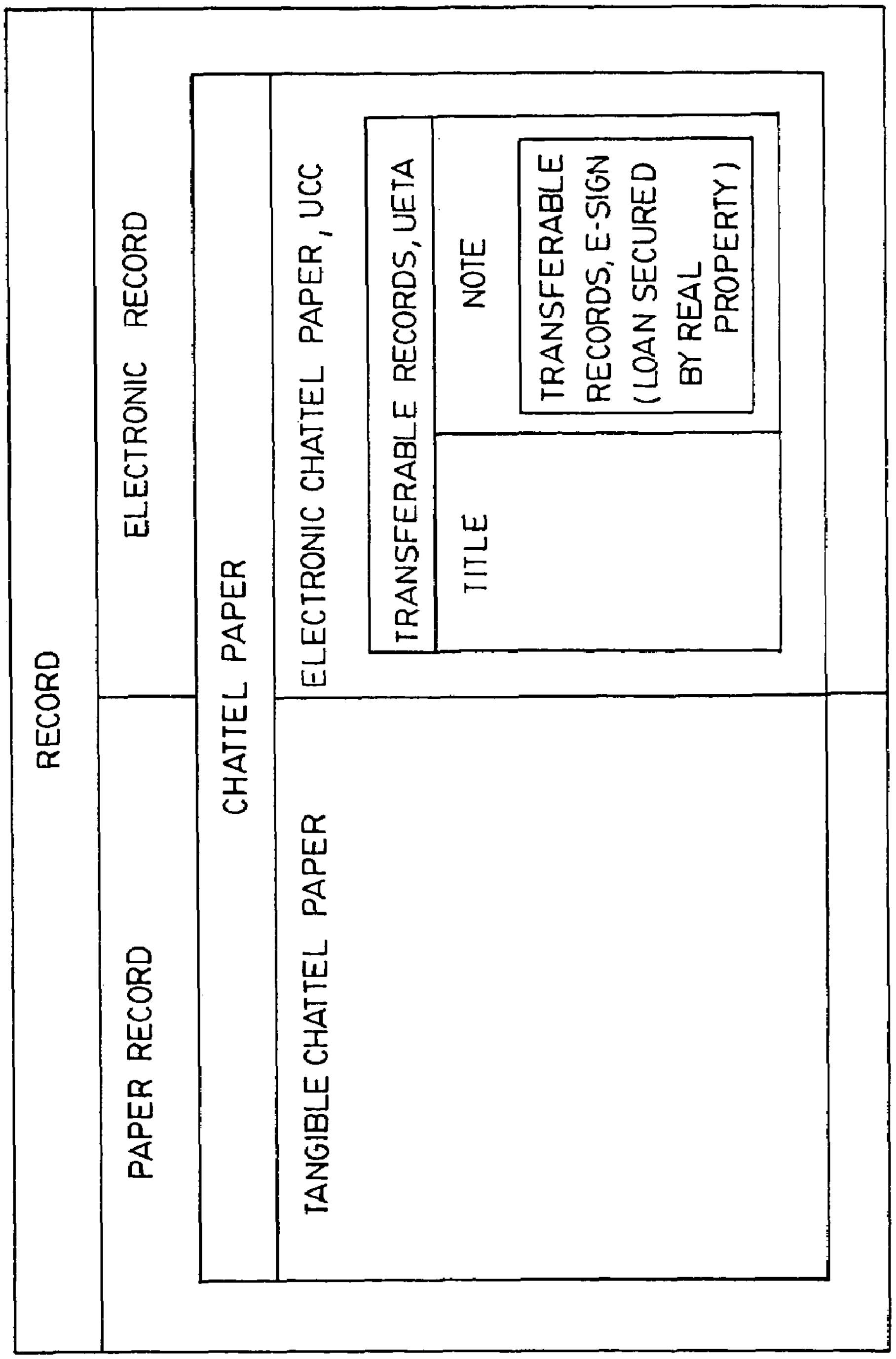
FIG. 1 is a schematic representation of the interrelationship of key legal terms used in the present description.

The present invention establishes a new category of business information systems called the Transferable Records Management System (TRMS). The system of the present invention provides a reliable and secure TRMS solution for electronically creating, asserting ownership, and transferring ownership of legal financial and commercial instruments known as Transferable Records (TRs). It will be understood that in the present description, the expression TRM and TRMS are equivalent and designate the system of the present invention.

The present invention replaces securitized paper documents such as chattel paper, notes, documents of title, and promissory notes backed by real property. A TRMS solution promises significant business advantages over today's use of paper in various sectors including the financial services, insurance, and commerce industries. A major application of the present invention with immediate return on investment is the electronic processing of promissory notes in the lending marketplace. Using the invention, lending institutions can seamlessly integrate this TRMS solution into their existing infrastructure to securely manage promissory notes throughout their life cycle, totally in electronic form.

This section provides discusses key drivers for using a TRMS solution, provides a brief overview of the legal requirements governing TRs and e-chattel, and defines the terms used in this document.

Document Terminology

Notwithstanding the legal definitions provided previously, the following terms are defined herein below for the purpose of this document:

Electronic Chattel Paper (e-chattel) means an electronic record as governed by UCC 9-105.

Transferable Record (TR) means an electronic record as defined in UETA and E-SIGN. A TR is also governed by the same legal requirements of UCC 9-105. Under E-SIGN, a TR is the electronic equivalent to a promissory note secured by real property. Often, a TR is represented as a PDF file in the lending industry.

Loan contract means a record constituting a TR. It is equivalent to a promissory note under UCITA and E-SIGN.

TRM or TRMS means a Transferable Records Manager or Transferable Records Management System for processing TRs, whether they are notes, documents of title, or promissory notes secured by real property. One of the most important functions of a TRMS solution is to identify the Authoritative Copy of a particular TR and to distinguish it from all other copies. Notes, documents of title, and promissory notes secured by real property are identical from the functional and operational perspectives of the present invention.

Since the legal requirements for a TR include the same requirements that apply to a TR under UCC 9-105, a TRMS can be used for processing and controlling e-chattel in the same way as for TRs.

Assignee means the party who has current control over a particular TR.

Owner means the current assignee of a particular TR.

Secured Party also means the current assignee of a particular TR. A lender is an example of a secured party.

Transfer transaction means the process by which the current assignee (i.e. owner) of a TR initiates the transfer of ownership to the new owner of that particular TR.

Seller means the pre-transfer party of a TR. Seller is a role that only exists during a transfer transaction. Only owners or authorized representatives can be sellers.

Buyer means the post-transfer party of a TR. Buyer is a role that only exists during a transfer transaction.

Assigner means a seller of a particular TR. As with the term seller, the term assigner exists only during a transfer transaction. In contrast, the term assignee refers to the party that exerts control over that TR during the entire period of control. Therefore, the assignee (or owner) becomes the assigner (or seller) during the transfer transaction, while the accepting party becomes the assignee (or buyer or new owner) at the end of the transfer transaction.

An Example from the Mortgage Lending Industry

This section provides the context needed to better describe the TRMS and its benefits by using the end-to-end loan process as an example from the mortgage lending industry and by highlighting the key differences between tangible chattel paper and transferable records (or electronic chattel paper).

Background

An increasing number of lending firms are using electronic signatures to minimize the amount of paper documents in their loan processes. Once mortgages are approved and closed electronically, they have to be delivered to investors, archived by custodians, and serviced by servicing firms. To reap the full benefits from the use of electronic signatures, lenders need to be able to securitize, control, and transfer these loans in an automated fashion. Consequently, lenders can:

- Become more responsive to customer needs and market changes.
- Reduce operating costs by streamlining their lending business processes.
- Capitalize on emerging opportunities due to market consolidation and deregulation.
- Optimize their interactions with business partners including other lenders, originators, agents, recorders, custodians, investors, Government Supported Enterprises (GSEs) such as Fannie Mae and Freddie Mac, and other government agencies.
- Operate in a world that is increasingly driven by real-time access to accurate data and information.

Today's Lending Environment

Lenders often fund their lending activities by securitizing the loans they have made to their customers. Securitization allows the lender to take a group of loans and sell them to investors. However, to sell the loans to investors, the loan contracts and related documents are used as the proof of the loan and its collectability. These documents, known as chattel paper, can now also be created and processed electronically, and are referred to as electronic chattel paper (e-chattel). The loan contracts that constitute e-chattel or TRs must be signed using electronic signatures. There can be only one original or Authoritative Copy of chattel paper that gives the owner the rights to the proceeds from the loan. However, the owner or an appointed custodian must legally have control of the TR or e-chattel.

The End-to-End Loan Process

Figure 2:
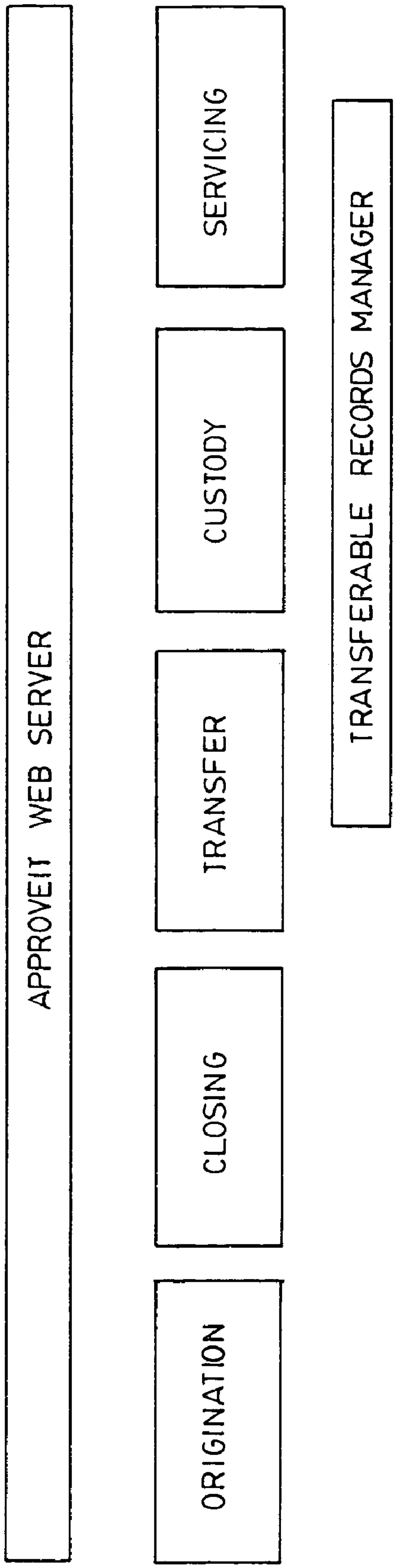
FIG. 2 is a schematic representation of the end-to-end loan process.

FIG. 2 depicts a generic, end-to-end loan process consisting of five stages: origination, closing, transfer, custody, and servicing. A system for obtaining and managing electronic signatures, such as the one commercialized by Silanis Technology Inc. under the name "ApproveIt®[1] Web Server", hereinafter referred to as "AWS" is used in any of these five stages to obtain and manage electronic signatures and approvals.

In a typical transfer process, loan contracts are prepared for the borrower by the lender's systems. The borrower then electronically reviews and signs the e-contracts using the ApproveIt® Web Server or any other appropriate software package. The resulting e-contracts are then transferred to the lender's repository for storage and further processing. At some later time, the lender may wish to "secure" (i.e. sell) the loan as part of a collection of loans. Preferably, all loans have been signed using the ApproveIt® Web Server, and are now stored in the repository of the lender. Thus, the TRM can be used to convert these loan-documents into TRs and then transfer the ownership from the seller, who is presently the lender, to a buyer who is generally an investor. The buyer can then verify that the transfer has actually occurred by querying the TRM.

The TRM is targeted at the transferable records part of the loan process, addressing the business needs beyond electronic signatures and approvals of a loan origination application. Once a customer signs a loan application, several processes are triggered across various financial institutions for the purpose of securitizing and transferring the ownership of closed loans. The present invention is a secure TRMS solution that is specifically designed to automate transfers of ownership of transferable records and electronic chattel paper.

The Paper World vs. the Electronic World

To understand the basic operational concept of the invention, it is important to realize that one cannot directly and exactly map paper world artifacts and methods onto an electronic environment.

Table 1 highlights the key differences between tangible chattel paper and electronic chattel paper.

TABLE 1

Key Differences Between the Paper World and the Electronic World

| The Paper World | The Electronic World |
| --- | --- |
| It is very difficult and costly to copy tangible chattel paper such as promissory notes or currency. Tangible chattel paper usually has special features (e.g. special ink, colors, and invisible markings) that require a significant amount of expertise and cost to copy. | Electronic records can be easily and cheaply copied. An unlimited number of identical copies can be created. No special expertise is required beyond basic knowledge such as operating a personal computer. Since a TR is often an electronic document such as a PDF file, it is simple and easy to make copies of that TR. |
| It is somewhat simple and easy to distinguish an original tangible chattel paper from a copy. The use "wet ink on paper" is an indicator that a particular tangible paper chattel is the original, is unique, and is distinguishable from a copy of that original tangible chattel paper. | There is no simple or easy way to distinguish an electronic copy from the "original". The constituent computer bits of a TR are identical and indistinguishable from the constituent computer bits of a copy of that TR. A TR is usually created, stored, and transmitted many times across different systems - with a high likelihood that a copy is stored in each system. In fact, the intentional copying of TRs is required to satisfy legitimate business needs such as making a backup of a particular system for recovery in case of failure. |
| Proving ownership of tangible chattel paper is relatively easy - the owner is either the holder of, or the individual whose last signature appears on, that tangible chattel paper. | Proving ownership of a TR is very difficult, requiring a sophisticated secure system to unequivocally prove such ownership. |

[1] Approvelt is a registered trade-mark of Silanis Technology Inc.

The TRM 10 of the present invention is designed to address the above challenges as described next.

Transferable Records Manager Concepts

Figure 3:
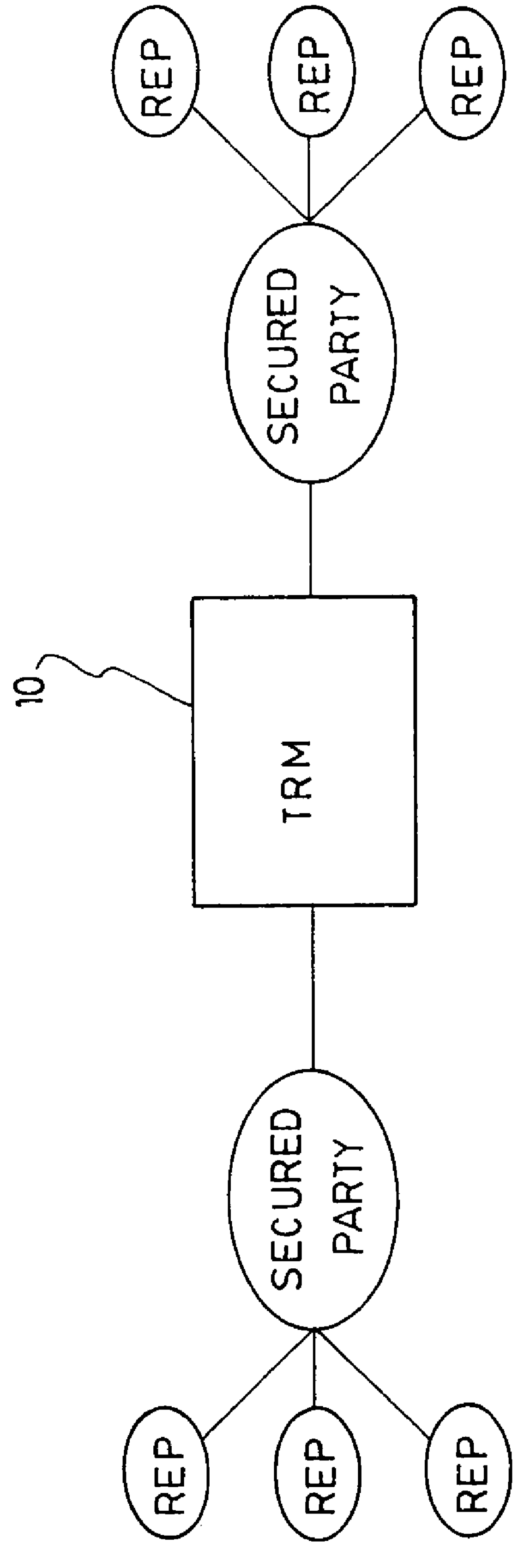
FIG. 3 is a schematic representation of the TRM operating model according to a preferred embodiment of the invention.

FIG. 3 depicts the TRM 10 operating model. Each secured party (e.g. lender) can authorize one or more representatives to interact with the TRM 10 on behalf of that lender.

The following concepts constitute the foundation for the TRM 10 of the present invention:

Transfer Control Key
Transfer Control Certificate
TR Transaction Evidence
TR Chain of Ownership
TR Registry Record Transfer Control Key A Transfer Control Key is a private key that is securely created by the system of the secured party when registering with the TRM 10. This is done following established mathematical cryptographic techniques where the system of the secured party interacts with the TRM 10 in a secure fashion. Each party or system participating in TRM 10 transactions must register with the TRM 10 and receive a unique Transfer Control Key. This Transfer Control Key belongs to the secured party, not to the representatives of that secured party. However, the TRM 10 allows the authorized representatives of a secured party to use the Transfer Control Key. Owners of TRs use their Transfer Control Keys to assert ownership of, exert control over, and sell their TRs that are registered with the TRM 10. Buyers use their Transfer Control Keys to accept ownership of TRs assigned to them. The TRM 10 securely stores and manages all Transfer Control Keys.

It is important to note that the Transfer Control Key is, at all times, under the total and exclusive control of the party to whom it was issued. The explicit knowledge, consent, and confirmation of that party are required before the TRM 10 can use the Transfer Control Key in any TRM 10 transaction.

Transfer Control Certificate

A Transfer Control Certificate is a standard X.509 v3 certificate that is issued by the TRM 10. It contains the public key counterpart to the Transfer Control Key (i.e. the private key) in addition to identity and other information as needed by the TRM 10. Each secured party or system participating in TRM 10 transactions must register with the TRM 10 and receive a Transfer Control Certificate. As with the Transfer Control Key, the Transfer Control Certificate belongs to the secured party, not to the representatives of that secured party. However, the TRM 10 allows the authorized representatives of a secured party to use the Transfer Control Certificate. The TRM 10 controls and manages all Transfer Control Certificates, which are central to its secure and proper operation.

The TRM 10 also uses the Transfer Control Certificate to access the respective public keys of the secured parties that are participating in TRM transactions when needed. This usage may or may not require the explicit knowledge, consent, or confirmation of the involved parties. In contrast, the Transfer Control Keys (which are private keys) can only be used with the explicit knowledge, consent, and confirmation of the secured parties involved in an TRM transaction and remain under their total and exclusive control at all times.

TR Transaction Evidence

A TR Transaction Evidence is a secure TRM electronic record that demonstrates the occurrence of a particular ownership transfer transaction. One may think of a TR Transaction Evidence as the secure audit trail or the electronic receipt evidencing the occurrence of that particular transaction. In addition to securely storing and keeping the TR Transaction Evidence, the TRM 10 sends it to the secured party for safekeeping if desired.

Each electronic record representing a TR Transaction Evidence is securely stored in the TRM 10, not in the TR itself. This record or transaction descriptor, is preferably implemented using a standards-based XML structure that, within the TRM 10, is designed to comply with the legal requirements set forth in UCC 9-105, UETA Section 16, and E-SIGN Title II. The TRM 10 authenticates and secures this TR Transaction Evidence using advanced cryptographic techniques and electronic signature technology.

Transaction Descriptor

The Transaction Descriptor is used to construct the TR Transaction Evidence. It is used to securely execute transfer transactions. The syntax of this Transaction Descriptor is based on an XML structure. An example of the syntax structure follows. It will of course be understood that the principles of the present invention can be met with another XML structure, or any other structure which meets the objectives of the present invention.

```
- <transfer-transaction>
  - <trm2-signed-transfer-transaction>
      <trm2-timestamp> </trm2-timestamp>
      <trm2-timezone> </trm2-timezone>
    - <assignee-representative-info>
        <name> </name>
        <uid> </uid>
        <certificate> </certificate>
      </assignee-representative-info>
    - <assignee-signed-transfer-transaction>
        <assignee-timestamp> </assignee-timestamp>
        <assignee-timezone> </assignee-timezone>
      - <assignor-signed-transfer-transaction>
          <assignor-timestamp> </assignor-timestamp>
          <assignor-timezone> </assignor-timezone>
        - <trm1-signed-transfer-transaction>
            <trm1-timezone> </trm1-timezone>
            <transaction-uid> </transaction-uid>
            <type-of-transfer> </type-of-transfer>
            <comment> </comment>
          - <assignor-info>
              <name> </name>
              <uid> </uid>
             <certificate> </certificate>
            </assignor-info>
          - <assignee-info>
              <name> </name>
              <uid> </uid>
              <certificate> </certificate>
            </assignee-info>
          - <assignor-representative-info>
              <name> </name>
              <uid> </uid>
              <certificate> </certificate>
            </assignor-representative-info>
          <document-list>
            - <document>
                <name> </name>
                <uid> </uid>
                <hash> </hash>
              </document>
            </document-list>
          </trm1-signed-transfer-transaction>
        - <trm1-signature>
          - <ds:Signature>
            - <ds:SignedInfo>
                <ds:CanonicalizationMethod>
                <ds:SignatureMethod>
              - <ds:Reference>
                  <ds:DigestMethod>
                  <ds:DigestValue> </ds:DigestValue>
                </ds:Reference>
              </ds:SignedInfo>
            <ds:SignatureValue> </ds:SignatureValue>
          - <ds:KeyInfo>
            - <ds:X509Data>
                <ds:X509Certificate>
                </ds:X509Certificate>
              </ds:X509Data>
            - <ds:KeyValue>
              - <ds:RSAKeyValue>
                  <ds:Modulus> </ds:Modulus>
                  <ds:Exponent> </ds:Exponent>
                </ds:RSAKeyValue>
              </ds:KeyValue>
            </ds:KeyInfo>
          </ds:Signature>
        </trm1-signature>
      </assignor-signed-transfer-transaction>
    - <assignor-signature>
      - <ds:Signature>
        - <ds:SignedInfo>
            <ds:CanonicalizationMethod/>
            <ds:SignatureMethod/>
          - <ds:Reference>
              <ds:DigestMethod/>
              <ds:DigestValue> </ds:DigestValue>
            </ds:Reference>
          </ds:SignedInfo>
```

-continued

```
          <ds:SignatureValue> </ds:SignatureValue>
        </ds:Signature>
      </assignor-signature>
    </assignee-signed-transfer-transaction>
  - <assignee-signature>
    - <ds:Signature>
      - <ds:SignedInfo>
          <ds:CanonicalizationMethod/>
          <ds:SignatureMethod/>
        - <ds:Reference>
            <ds:DigestMethod/>
            <ds:DigestValue> </ds:DigestValue>
          </ds:Reference>
        </ds:SignedInfo>
      <ds:SignatureValue> </ds:SignatureValue>
    </ds:Signature>
  </assignee-signature>
</trm2-signed-transfer-transaction>
- <trm2-signature>
  - <ds:Signature>
    - <ds:SignedInfo>
        <ds:CanonicalizationMethod/>
        <ds:SignatureMethod/>
      - <ds:Reference>
          <ds:DigestMethod/>
          <ds:DigestValue> </ds:DigestValue>
        </ds:Reference>
      </ds:SignedInfo>
      <ds:SignatureValue> </ds:SignatureValue>
    - <ds:KeyInfo>
      - <ds:X509Data>
          <ds:X509Certificate> </ds:X509Certificate>
        </ds:X509Data>
      - <ds:KeyValue>
        - <ds:RSAKeyValue>
            <ds:Modulus> </ds:Modulus>
            <ds:Exponent> </ds:Exponent>
          </ds:RSAKeyValue>
        </ds:KeyValue>
      </ds:KeyInfo>
    </ds:Signature>
  </trm2-signature>
  <status> </status>
<transfer-transaction>
```

The Transaction Descriptor is designed in such as way so as to achieve the following:

The Transaction Descriptor is organized as a nested hierarchical structure at the core of which is the transaction content that lists multiple TRs that are participating in a transaction, the parties involved and their roles, as well as numerous other transaction attributes. TRs in a transaction are presented in a fashion that uniquely binds each TR to a TRM Registry Record. The Transaction Descriptor is initially signed by the transaction originator and, once content is validated, is countersigned by the TRM. The Transaction Descriptor ultimately becomes an instruction for the TRM. The TRM transaction is carried out by passing the Transaction Descriptor from one party to another in a sequence relevant for a particular transaction type. Each party affects the Transaction Descriptor in a way that clearly specifies the intension of a party with respect to a given transaction to be executed by the TRM.

Particular pieces of information are bound by digital signatures of the parties that are involved in a transaction, including the TRM system itself. Each transacting party populates the Transaction Descriptor with relevant information that is sufficient to fulfill a particular role, and then digitally signs the Transaction Descriptor in sequence. Each digital signature is validated and countersigned by the TRM system to ensure the integrity of the Transaction Descriptor, the associated information, and the overall transaction. The nested nature of the Transaction Descriptor allows it (the Transaction Descriptor) to grow while keeping the inner data intact without affecting any of the earlier digital signatures.

The Transaction Descriptors are eventually combined to create the TR Chain of Ownership. Since the TRM performs only commands represented by the Transaction Descriptor, each TR state change (i.e. initiated, pending, completed, cancelled, etc.) will have a corresponding Transaction Descriptor. The combination of Transaction Descriptors will produce the full TR Chain of Ownership. One could think of this as a graph where the nodes represent the Chain of Transaction Descriptors and the TR Chain of Ownership is the path that a particular TR takes through these nodes.

Transaction Descriptors can recreate all of the ownership data in the TRM Registry. The Transaction Descriptors that are issued by the TRM contain all the information necessary to re-create the ownership data and transfer history for each TR in the associated TRM Registry. Transaction Descriptors that contain a particular TR history are sufficient to fully recover the TR's registry record. This property of the system minimizes risks of loss of this critical data.

Transaction Descriptor Example

An example of a populated Transaction Descriptor XML structure, showing a transaction for a particular document, follows. It will of course be understood that the principles of the present invention can be met with another XML structure, or any other structure which meets the objectives of the present invention. In this example, Secured Party 1 assigns a TR represented by the document "test.pdf" to Secured Party 2.

```
- <transfer-transaction id="transfer-transaction-5s2pWV/2jvS/KzFmIAYzJTE3IXs=">
  - <trm2-signed-transfer-transaction id="TRM2-transfer-transaction-
        5s2pWV/2jvS/KzFmIAYzJTE3IXs=">
      <trm2-timestamp>2003-01-23T10:18:02Z</trm2-timestamp>
      <trm2-timezone>0</trm2-timezone>
    - <assignee-representative-info>
        <name> Secured Party 1 AWS System</name>
        <uid> Secured Party 1AWS System</uid>
          <certificate>MIIB2zCCAUSgAwIBAgIIAgAAAAAAAAEwDQYJKoZIh
          vcNAQEFBQAwIjEgMB4GA1UEAxMXWERPWCBST09UIDogREVB
          TEVSVFJBQ0swHhcNMDMwMTA2MjIwNjU0WhcNMDQwMTA2MjI
          wNjU0WjAqMSgwJgYDVQQDEx9EZWFsZXJ0cmFjayBBV1MgU3Iz
          dGVtIChhY2NIc3MpMIGfMA0GCSqGSIb3DQEBAQUAA4GNADCBi
          QKBgQCyK5JgXzuhqfdE666LjSnWHbwDhdOHMbuytpL8enRhv6T
          isBVDK5FG4VErNRsb/PZbIwViPx+HsuOo19ABBbwi1XGId2UQq4
          1kX+pAjYtZpPqcUzf2EZEups8K4Q/pwNsyJc1KGaaONfIKhHAS3B
          STiuMtzf7KPRoy3cgRK1wmeQIDAQABoxIwEDAOBgNVHQ8BAf8
          EBAMCBsAwDQYJKoZIhvcNAQEFBQADgYEAFIuv/z00ZNMm56p
          2un+jK71cy09UWBeTvh59B9nNrPbgR90oZrAI2R3659VPn8z7s245
          XRYY6zH2kWWUKiYeRZ5r0ptEZbQSiWojCqFz2z9hTkzQYQ5ekCv
          0NTNyvec4Qxf5kSoytwtkPo/EtreW5BJPZAA0WVJ5V8QJYbWZSP
          U=</certificate>
      </assignee-representative-info>
    - <assignee-signed-transfer-transaction id="ASSIGNEE-transfer-transaction-
          5s2pWV/2jvS/KzFmIAYzJTE3IXs=">
        <assignee-timestamp>2003-01-23T10:18:00Z</assignee-timestamp>
        <assignee-timezone>0</assignee-timezone>
      - <assignor-signed-transfer-transaction id="ASSIGNOR-transfer-
            transaction-5s2pWV/2jvS/KzFmIAYzJTE3IXs=">
          <assignor-timestamp>2003-01-23T10:17:53Z</assignor-timestamp>
          <assignor-timezone>0</assignor-timezone>
        - <trm1-signed-transfer-transaction id="TRM1-transfer-transaction-
              5s2pWV/2jvS/KzFmIAYzJTE3IXs=">
            <trm1-timezone>-1</trm1-timezone>
            <transaction-uid>transfer-transaction-
              5s2pWV/2jvS/KzFmIAYzJTE3IXs=</transaction-uid>
            <type-of-transfer>1</type-of-transfer>
            <comment>transfer</comment>
          - <assignor-info>
              <name> Secured Party 1</name>
              <uid> Secured Party 1</uid>
                <certificate>MIIB0zCCATygAwIBAgIIAQAAAAAAA
                AMwDQYJKoZIhvcNAQEFBQAwIjEgMB4GA1UEA
                xMXWERPWCBST09UIDogREVBTEVSVFJBQ0swH
                hcNMDMwMTA2MjIwNjU3WhcNMDQwMTA2MjIwNj
                U3WjAiMSAwHgYDVQQDExdEZWFsZXJ0cmFjayA
                ob3duZXJzaGIwKTCBnzANBgkqhkiG9w0BAQEFA
                AOBjQAwgYkCgYEAyDMIZKRWyBjgNbKIbG+Q5A
                6zSVLhjBfZSCgj3L5nKTNfgIW08Q/yoVZ58oEuCS/
                eIGs2T9kUbupy4fHj2jtkeE8CnT0U6D9jqOBX6AnS
                puDEn+g+/nyqFv8ufNcqwtVuGoqsA2Lybb33fnxX
                OAYBoMbZM7Lgah176yXBKrWDuzcCAwEAAaMS
                MBAwDgYDVR0PAQH/BAQDAgbAMA0GCSqGSIb
                3DQEBBQUAA4GBAEAfigGGP8jUzLERw9CCQHs
```

-continued

+CuZ1wTcNVgPtUe0nIX0OIIy37IK/d5/zwt+oZ83I5p
2xrxCYhTaFoI3bk7WkqWK0N8LoPGQL3vmqniYLY
66M1Y5O1FFHOflsxI1st5IZxhjdxgcSesobdB9n91F
eeIIwude7QX+PFmTsmbmI1Mrd</certificate>
</assignor-info>
- <assignee-info>
<name> Secured Party 2</name>
<uid> Secured Party 2</uid>
<certificate>AIIB0zCCATygAwIBAgIIAQAAAAAAAA
IwDQYJKoZIhvcNAQEFBQAwIjEgMB4GA1UEAxM
XWERPWCBST09UIDogREVBTEVSVFJBQ0swHhc
NMDMwMTA2MjIwNjU2WhcNMDQwMTA2MjIwNjU
2WjAiMSAwHgYDVQQDExdBbWVyaWNyZWRpdC
Aob3duZXJzaGIwKTCBnzANBgkqhkiG9w0BAQEF
AAOBjQAwgYkCgYEAqFqU1o5mITWoQY6euxhPY
bjo4b8XfdKt8ZrunvHot+f8x4zqz7KrXvZGQ/qU402I
yUnZqyY/ZfvB2u69LA0BHmDO/f2hW0NOhzsST0+
JaI8E7j1YQ3CV92UHPvpX8FQcBjLf3KNZSGXHYT
9u2jZIrJC9YZo5p7iNaiRQxrSFZDcCAwEAAaMSMB
AwDgYDVR0PAQH/BAQDAgbAMA0GCSqGSIb3D
QEBBQUAA4GBAJxDCegugvUE+Ev8uQJM3rw8xt
U2ASm6zPSP7E+T9c9qJtIETfoWLur+1nxB10yK1S
PQgTH5rX2iuhCkp5QRuTbY7C8vgaO/OIm8+KE24
aI1KghkiozPuz9eU/EWUHjM11C2O/tT5Ed7QF00B4
+ss3rBbxBNu0ptyXHBWzxYfpEa</certificate>
</assignee-info>
- <assignor-representative-info>
<name> Secured Party 1AWS System</name>
<uid> Secured Party 1AWS System</uid>
<certificate>MIIB2zCCAUSgAwIBAgIIAgAAAAAAA
AEwDQYJKoZIhvcNAQEFBQAwIjEgMB4GA1UEAx
MXWERPWCBST09UIDogREVBTEVSVFJBQ0swH
hcNMDMwMTA2MjIwNjU0WhcNMDQwMTA2MjIwNj
U0WjAqMSgwJgYDVQQDEx9EZWFsZXJ0cmFjayB
BV1MgU3IzdGVtIChhY2NIc3MpMIGfMA0GCsqGSI
b3DQEBAQUAA4GNADCBiQKBgQCyK5JgXzuhqf
dE666LjSnWHbwDhdOHMbuytpL8enRhv6TisBVD
K5FG4VErNRsb/PZbIwViPX+HsuOo19ABBbwi1XGI
d2UQq41kX+pAjYtZpPqcUzf2EZEups8K4Q/pwNsy
Jc1KGaaONfIKhHAS3BSTiuMtzf7KPRoy3cgRK1w
meQIDAQABoxIwEDAOBgNVHQ8BAf8EBAMCBsA
wDQYJKoZIhvcNAQEFBQADgYEAFIuv/z00ZNMm5
6p2un+jK71cy09UWBeTvh59B9nNrPbgR90oZrAI2
R3659VPn8z7s245XRYY6zH2kWWUKiYeRZ5r0ptE
ZbQSiWojCqFz2z9hTkzQYQ5ekCv0NTNyvec4Qxf5
kSoytwtkPo/EtreW5BJPZAA0WVJ5V8QJYbWZSPU
=</certificate>
</assignor-representative-info>
- <document-list>
- <document>
<name>test.pdf</name>
<uid>test.pdfyf7sgs3ihFrntFIMiBGdG6TltyY=<
/uid>
<hash>AAECAwQFBgcICQoLDA0ODxAREgA
=</hash>
</document>
</document-list>
</trm1-signed-transfer-transaction>
- <trm1-signature>
- <ds:Signature
xmlns:ds="http://www.w3.org/2000/09/xmldsig#">
- <ds:SignedInfo
xmlns:ds="http://www.w3.org/2000/09/xmldsig#">
<ds:CanonicalizationMethod
xmlns:ds="http://www.w3.org/2000/09/xmldsig
#"
Algorithm="http://www.w3.org/TR/2001/REC-
xml-c14n-20010315" />
<ds:SignatureMethod
xmlns:ds="http://www.w3.org/2000/09/xmldsig
#"
Algorithm="http://www.w3.org/2000/09/xmldsig
#rsa-sha1" />
- <ds:Reference
xmlns:ds="http://www.w3.org/2000/09/xmldsig
#" URI="#TRM1-transfer-transaction-
5s2pWV/2jvS/KzFmIAYzJTE3IXs=">
<ds:DigestMethod
xmlns:ds="http://www.w3.org/2000/09/xm -continued

```
                Idsig#"
                Algorithm="http://www.w3.org/2000/09/x
                mldsig#sha1" />
              <ds:DigestValue
                xmlns:ds="http://www.w3.org/2000/09/xm
                Idsig#">LYEDWN+a3PLFuqR6nYsKwJfB
                WbU=</ds:DigestValue>
            </ds:Reference>
          </ds:SignedInfo>
          <ds:SignatureValue
            xmlns:ds="http://www.w3.org/2000/09/xmldsig#">d
            Hr6XIO+0kP9iHXjqC+uHordBPPTNWeF6LOwz6bN
            a4j+x43NXN2ce3dfbbnEtqv10HzUWSwKkiNV
            o2noI5fACnY8bVfsXHrCNSMObkuGN2dI+vModIP7
            xU9J1s4Kn0SkmDcm2TPnMSkpYXu6I3mfao6V
            gtJXJ9ETb6uHeOMpqT8=</ds:SignatureValue>
        - <ds:KeyInfo
            xmlns:ds="http://www.w3.org/2000/09/xmldsig#">
          - <ds:X509Data
              xmlns:ds="http://www.w3.org/2000/09/xmldsig
              #">
            <ds:X509Certificate
                xmlns:ds="http://www.w3.org/2000/09/xm
                Idsig#">MIIBzDCCATWgAwIBAgIBMTAN
                BgkqhkiG9w0BAQUFADAiMSAwHgYDV
                QQDExdYRE9YIFJPT1QgOiBE
                RUFMRVJUUkFDSzAeFw0wMzAxMDYy
                MjA2NTNaFw0wNDAxMDYyMjA2NTNaM
                CIxIDAeBgNVBAMTF1hE
                T1ggUk9PVCA6IERFQUxFUIRSQUNLMI
                GfMA0GCSqGSIb3DQEBAQUAA4GNAD
                CBiQKBgQDFCWe+xqsT
                MQh5tB1RKs3P6gjnpDBmjLTd0lyQ6k0Q
                r4UeBAsi9XS5A6fQ6ayYgg2KOfPG5ifaG
                jKUKTfR8mGs
                LAO6j/2zIL/j0xWEyBR8zjWircGwMjpFxr
                H6j/gTK860QunRj1J5/oOI8R77UNIBO7z
                YheB6fy/v
                IZLUf0AhjQIDAQABoxlwEDAOBgNVHQ8
                BAf8EBAMCBsAwDQYJKoZIhvcNAQEF
                BQADgYEAjwdK/OPI
                ghlpKUTraNCoTZ3ffZrib8FZptEbIKcHpK
                5tYKFacBsNKohcxnZZAzyOJkzxPIJ/dcw
                R6m75VavQ
                ZIRkCgtM8pt0X0uW4RwcNJy0r7i0cd/1v
                SVdvEstW9HSJcniJeeqJKkscGpJTtxa4
                SKx6wHk4vx1
                I9AMTNvGw+k=</ds:X509Certificate>
              </ds:X509Data>
          - <ds:KeyValue
                xmlns:ds"http://www.w3.org/2000/09/xmldsig
                #">
            - <ds:RSAKeyValue
                  xmlns:ds="http://www.w3.org/2000/09/xm
                  Idsig#">
                <ds:Modulus
                    xmlns:ds="http://www.w3.org/2000/0
                    9/xmldsig#">xQInvsarEzEIebQdUSr
                    Nz+oI56QwZoy03dCMkOpNEK+FH
                    gQLIvV0uQOn0OmsmIINijnzxuYn2
                    hoy
                    ICk30fJhrCwDuo/9syC/49MVhMgUf
                    M41oq3BsDI6Rcax+o/4EyvOtELp0
                    Y9Sef6DpfEe+1DSATu8
                    2IXgen8v75WS1H9AIY0=</ds:Modul
                    us>
                <ds:Exponent
                    xmlns:ds="http://www.w3.org/2000/0
                    9/xmldsig#">AQAB</ds:Exponent>
              </ds:RSAKeyValue>
            </ds:KeyValue>
          </ds:KeyInfo>
        </ds:Signature>
      </trm1-signature>
    </assignor-signed-transfer-transaction>
- <assignor-signature>
  - <ds:Signature xmlns:ds="http://www.w3.org/2000/09/xmldsig#">
    - <ds:SignedInfo
          xmlns:ds="http://www.w3.org/2000/09/xmldsig#">
```

-continued

```
        <ds:CanonicalizationMethod
            xmlns:ds="http://www.w3.org/2000/09/xmldsig#"
            Algorithm="http://www.w3.org/TR/2001/REC-xml-
            c14n-20010315"/>
        <ds:SignatureMethod
            xmlns:ds="http://www.w3.org/2000/09/xmldsig#"
            Algorithm="http://www.w3.org/2000/09/xmldsig#rsa-
            sha1"/>
      - <ds:Reference
            xmlns:ds="http://www.w3.org/2000/09/xmldsig#"
            URI="#ASSIGNOR-transfer-transaction-
            5s2pWV/2jvS/KzFmIAYzJTE3IXs=">
          <ds:DigestMethod
              xmlns:ds="http://www.w3.org/2000/09/xmldsig
              #"
              Algorithm="http://www.w3.org/2000/09/xmldsig
              #sha1"/>
          <ds:DigestValue
              xmlns:ds="http://www.w3.org/2000/09/xmldsig
              #">Gh0aJLK42TjtOgPC1Fiq7xp+Fa4=</ds:Dig
              estValue>
        </ds:Reference>
      </ds:SignedInfo>
      <ds:SignatureValue
        xmlns:ds="http://www.w3.org/2000/09/xmldsig#">f0yHxZ
        q6Q8ktQhSwHNmxiYAh2o9qEjYSxcOOLrRr95AukGxpG
        1W+ApGP5wqEsmyyiBNcK6Np/ra2
        Cv/+imNim1I9N16grZxMcwOQOk+EtbixMUYxldKXD17F
        Da8pSuYWK6ZF8Y/8Ry6NMX3AH7eKUfy5
        fEK2qTs3KSCAJrBWmSs=</ds:SignatureValue>
       </ds:Signature>
      </assignor-signature>
    </assignee-signed-transfer-transaction>
- <assignee-signature>
    - <ds:Signature xmlns:ds="http://www.w3.org/2000/09/xmldsig#">
      - <ds:SignedInfo xmlns:ds="http://www.w3.org/2000/09/xmldsig#">
        <ds:CanonicalizationMethod
          xmlns:ds="http://www.w3.org/2000/09/xmldsig#"
          Algorithm="http://www.w3.org/TR/2001/REC-xml-c14n-
          20010315"/>
        <ds:SignatureMethod
          xmlns:ds="http://www.w3.org/2000/09/xmldsig#"
          Algorithm="http://www.w3.org/2000/09/xmldsig#rsa-
          sha1"/>
        - <ds:Reference
          xmlns:ds="http://www.w3.org/2000/09/xmldsig#"
          URI="#ASSIGNEE-transfer-transaction-
          5s2pWV/2jvS/KzFmIAYzJTE3IXs=">
         <ds:DigestMethod
            xmlns:ds="http://www.w3.org/2000/09/xmldsig#"
            Algorithm="http://www.w3.org/2000/09/xmldsig#sha
            1"/>
         <ds:DigestValue
            xmlns:ds="http://www.w3.org/2000/09/xmldsig#">qv
            F8zTjMSP42mfQx//WEGG3IIpA=</ds:DigestValue>
        </ds:Reference>
      </ds:SignedInfo>
      <ds:SignatureValue
        xmlns:ds="http://www.w3.org/2000/09/xmldsig#">fg3S5jJI4K9j
        ZIY8cxS+bTHuoKzTanvsbU5xZBC/50k2GWKY+yxlxthrWtLA
        K2dYj6SCchGu4oVb
        y6rpXjPazzICWp1IIhcR21IsREBNocY50aotNxt1v84vdcLaVKZ
        7Joih3wF1C1KCp802SfEd7Y7n
        FTHqEtikfWUKUnScOws=</ds:SignatureValue>
      </ds:Signature>
      </assignee-signature>
    </trm2-signed-transfer-transaction>
- <trm2-signature>
    - <ds:Signature xmlns:ds="http://www.w3.org/2000/09/xmldsig#">
      - <ds:SignedInfo xmlns:ds="http://www.w3.org/2000/09/xmldsig#">
        <ds:CanonicalizationMethod
          xmlns:ds="http://www.w3.org/2000/09/xmldsig#"
          Algorithm="http://www.w3.org/TR/2001/REC-xml-c14n-
          20010315"/>
        <ds:SignatureMethod
          xmlns:ds="http://www.w3.org/2000/09/xmldsig#"
          Algorithm="http://www.w3.org/2000/09/xmldsig#rsa-sha1"/>
        - <ds:Reference xmlns:ds="http://www.w3.org/2000/09/xmldsig#"
          URI="#TRM2-transfer-transaction-
```

-continued

```
            5s2pWV/2jvS/KzFmIAYzJTE3IXs=">
            <ds:DigestMethod
              xmlns:ds="http://www.w3.org/2000/09/xmldsig#"
              Algorithm="http://www.w3.org/2000/09/xmldsig#sha1"/>
            <ds:DigestValue
              xmlns:ds="http://www.w3.org/2000/09/xmldsig#">h7XZV
              pWbQLd8fPGGfHZHMUYEd+U=</ds:DigestValue>
          </ds:Reference>
        </ds:SignedInfo>
        <ds:SignatureValue
          xmlns:ds="http://www.w3.org/2000/09/xmldsig#">Ht7ggUCxXzH6w
          DMxrLT9z4BzA/yaOGeO7IrOTnA8CVPywzjILRqFwT+jRVIWf79wH
          BWo1I01qsBq
          5FMLMamYUVBKkZ9ULz+cbIZGHPNLUK/p7GVnbOW28siPm/WyE
          yDqhkkpPyvC0415T6ZHEe787BnA
          W6eWee5d1TnSpZsjezE=</ds:SignatureValue>
      - <ds:KeyInfo xmlns:ds="http://www.w3.org/2000/09/xmldsig#">
        - <ds:X509Data xmlns:ds="http://www.w3.org/2000/09/xmldsig#">
            <ds:X509Certificate
              xmlns:ds="http://www.w3.org/2000/09/xmldsig#">MIIBzD
              CCATWgAwIBAgIBMTANBgkqhkiG9w0BAQUFADAiMS
              AwHgYDVQQDExdYRE9YIFJPT1QgOiBE
              RUFMRVJUUkFDSzAeFw0wMzAxMDYyMjA2NTNaFw0w
              NDAxMDYyMjA2NTNaMCIxIDAeBgNVBAMTF1hE
              T1ggUk9PVCA6IERFQUxFUIRSQUNLMIGfMA0GCSqGS
              Ib3DQEBAQUAA4GNADCBiQKBgQDFCWe+xqsT
              MQh5tB1RKs3P6gjnpDBmjLTd0IyQ6k0Qr4UeBAsi9XS5
              A6fQ6ayYgg2KOfPG5ifaGjKUKTfR8mGs
              LAO6j/2zIL/j0xWEyBR8zjWircGwMjpFxrH6j/gTK860Qun
              Rj1J5/oOI8R77UNIBO7zYheB6fy/v
              IZLUf0AhjQIDAQABoxIwEDAOBgNVHQ8BAf8EBAMCB
              sAwDQYJKoZIhvcNAQEFBQADgYEAjwdK/OPI
              ghIpKUTraNCoTZ3ffZrib8FZptEbIKcHpK5tYKFacBsNKo
              hcxnZZAzyOJkzxPIJ/dcwR6m75VavQ
              ZIRkCgtM8pt0X0uW4RwcNJy0r7i0cd/1vSVdvEstW9HSJ
              cniJeeqJKkscGpJTtxa4SKx6wHk4vx1
              I9AMTNvGw+k=</ds:X509Certificate>
            </ds:X509Data>
        - <ds:KeyValue xmlns:ds="http://www.w3.org/2000/09/xmldsig#">
          - <ds:RSAKeyValue
              xmlns:ds="http://www.w3.org/2000/09/xmldsig#">
              <ds:Modulus
                xmlns:ds="http://www.w3.org/2000/09/xmldsig#">x
                QInvsarEzEIebQdUSrNz+oI56QwZoy03dCMkOpNE
                K+FHgQLIvV0uQOn0OmsmIINijnzxuYn2hoy
                ICk30fJhrCwDuo/9syC/49MVhMgUfM41oq3BsDI6R
                cax+o/4EyvOtELp0Y9Sef6DpfEe+1DSATu8
                2IXgen8v75WS1H9AIY0=</ds:Modulus>
            <ds:Exponent
                xmlns:ds="http://www.w3.org/2000/09/xmldsig#">A
                QAB</ds:Exponent>
            </ds:RSAKeyValue>
          </ds:KeyValue>
          </ds:KeyInfo>
        </ds:Signature>
        </trm2-signature>
        <status>4</status>
</transfer-transaction>
```

Types of TR Transfer Evidence

There are three types of TR Transaction Evidence: a TR Origination Evidence, a TR Transfer Evidence, and a TR Pending Transfer Evidence.

TR Origination Evidence

A TR Origination Evidence clearly establishes which system originated a particular TR, for example the Approvelt® Web Server. A TR Origination Evidence also indicates who is the first party to exert control over a TR upon its creation, identifying this party as the sole and rightful owner of that TR. A TR Origination Evidence is considered a complete electronic record only when it is: 1) signed by the system originating the TR using its own Transfer Control Key, and 2) verified and signed by the TRM 10. The TR Origination Evidence can then be seen as the transaction receipt evidencing the completion of the initial assignment process. The TR Origination Evidence also indicates to the initial assignee that the TR has been created by a secure system that is compliant with the legal requirements for TRs.

TR Transfer Evidence

A TR Transfer Evidence clearly establishes that a TR transfer transaction has occurred, marks the date and time that the transfer has occurred, and indicates that the transfer has occurred with the full consent and agreement of the seller (assigner) and the buyer (assignee).

A TR Transfer Evidence also specifies who was the party that exerted control over a TR prior to the transfer transaction and who is the party that has control over that particular TR upon the completion of the transfer transaction. A TR Transfer Evidence is considered a complete electronic record only when: 1) the assigner (also referred to as seller, owner, or current assignee) applies its own Transfer Control Key indicating its intention and agreement to initiate the transfer transaction, 2) the assignee (also referred to as buyer or next owner) applies its own Transfer Control Key indicating its intention and agreement to accept the transfer transaction, and 3) verified and signed by the TRM 10. The TR Transfer Evidence can then be seen as the transaction receipt evidencing the completion of the TR transfer process. The new assignee can now maintain total and full control over that TR according to UCC 9-105 including any revisions and ownership transfers of that TR.

TR Transfer Pending Evidence

A TR Transfer Pending Evidence is a special type of a TR Transfer Evidence, indicating that a TR transfer transaction has been initiated by the seller (assigner) but has not yet been approved by the buyer (assignee). In fact, a TR Transfer Pending Evidence is an incomplete TR Transfer Evidence where the seller is still in control of that TR. Upon the completion of the transfer transaction, a TR Transfer Pending Evidence is augmented with the necessary information and signatures to become a TR Transfer Evidence.

TR Chain of Ownership

While a TR Transfer Evidence is the secure audit trail for a particular transfer transaction, a TR Chain of Ownership is the secure audit trail of the Authoritative Copy of a particular TR. It is the history that describes the origin of that TR and all its successive transfers. A TR Chain of Ownership is constructed using the TR Transaction Evidence records that are securely stored within the TRM 10.

TR Registry Record

A TR Registry Record is a secure electronic record representing a TR Transaction Evidence. All data relating to ownership and transfers of the Authoritative Copy of a particular TR is stored in one or more TR Registry Records and all related electronic signature tokens that were applied to the Authoritative Copy of that TR.

TRM Solution Architecture

The present invention is a secure TRMS solution that is used for controlling, processing, and managing TRs and their respective authoritative copies on behalf of the participating secured parties. This section provides an overview of the components and the high-level technical architecture of TRM 10, explains access control and security mechanisms used in TRM 10, and explains how TRM 10 identifies THE Authoritative Copy of a TR. It also demonstrates how the system of the present invention meets the legal requirements for TRs and authoritative copies, and compares the TRM 10 distributed approach to the centralized vault approach.

Components

Figure 4:
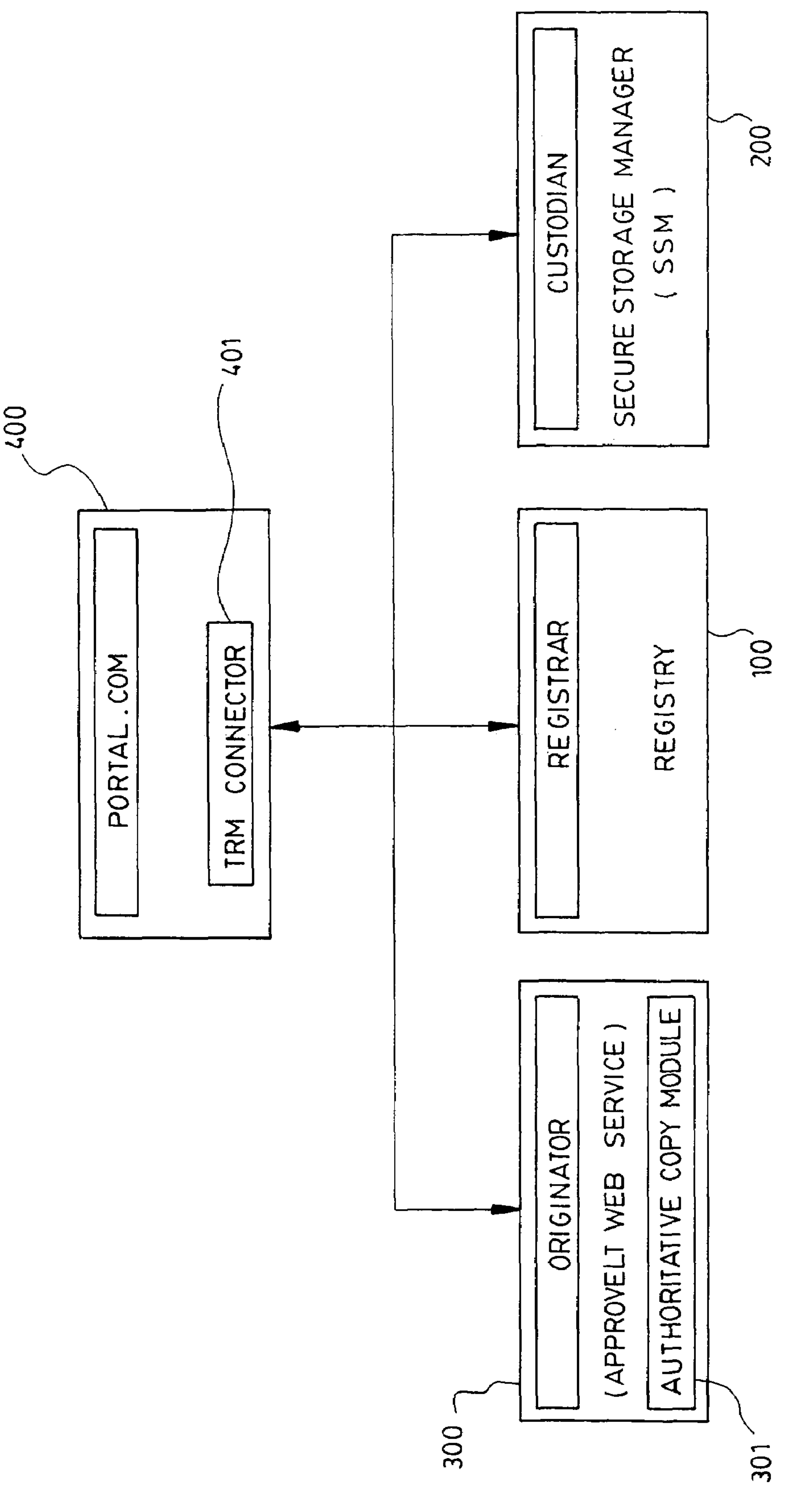
FIG. 4 is a schematic representation of the main components of a TRM solution according to a preferred embodiment of the invention.

FIG. 4 depicts the components of the TRM 10 solution along with the participating parties.

The Registry 100 and the Secure Storage Manager (SSM) 200 are standalone components that represent the core of the TRM 10 of the present invention. The Authoritative Copy Module 301 is an add-on to the ApproveIt® Web Server 300. It creates authoritative copies of the e-contracts generated by the ApproveIt® Web Server. The TRM Connector 401 is an add-on to portal applications 400 or other systems accessing the TRM 10. It uses a secure communications protocol to provide the connectivity required to integrate the target application or system into the TRM 10.

The "portal" 400 represents either a user-accessible application or a backend system-to-system capability for interacting with the TRM 10. Any participating party—Originator, Registrar, Custodian, or other third-party—can operate this portal. A Lender may participate as the Originator, Registrar, and/or Custodian. As depicted in FIG. 4, the Originator uses the ApproveIt® Web Server 300 to generate e-contracts. The TRM 10 uses this e-contract to create an Authoritative Copy of a TR that is owned by a particular Lender or investor. This TR is securely stored with a Custodian designated by the Lender. Subsequent to the initial assignment of ownership, the Lender (current secured party) can transfer ownership of the Authoritative Copy of this particular TR to another Lender (new secured party).

Registry

The Registry 100 is the heart of the TRM 10 solution. It consists of all the necessary logic required to manage and control the execution of all TRM 10 transactions by authorized parties. It also includes a secure database for storing the records of all transfer transactions. In a typical deployment scenario, a Registrar operates the Registry 100 either on behalf of its owner (e.g. Lender or investor) or as a third-party provider of hosted registry services.

Secure Storage Manager (SSM)

The Secure Storage Manager (SSM) 200 stores the actual TRs under the control of the Registry 100. In a typical deployment scenario, a Custodian operates the Secure Storage Manager 200 either on behalf of its owner (e.g. Lender or investor) or as a third-party provider of hosted custodial services. The TRM 10 architecture separates the Registry 100 from the Secure Storage Manager 200. This separation provides a high level of deployment flexibility that enables the Secure Storage Manager 200 to be implemented using standard database or document management technologies that are likely to be already in use by the Custodian. Furthermore, the distributed nature of this architecture allows the Custodian to provide access to TRs in the same manner used for providing access to other documents without involving the Registry 100. However, the participation of the Registry 100 is required to establish THE Authoritative Copy of a particular TR. This is discussed in detail hereinafter.

Authoritative Copy Module

The Authoritative Copy Module 301 is an add-on to the ApproveIt® Web Server 300 used to create an Authoritative Copy for a particular TR based on the e-contract generated by the ApproveIt® Web Server. This is done in collaboration with, and under the control of, the TRM 10. The Authoritative Copy Module 301 is a system-to-system software that enables the ApproveIt® Web Server and the TRM 10 to securely collaborate on the creation of authoritative copies. In a typical deployment scenario, the Originator operates the ApproveIt® Web Server 300 with its integrated Authoritative Copy Module 301 add-on.

TRM Connector

The TRM Connector 401 is used to securely interact with the Registry 100 and the Secure Storage Manager 200. The TRM Connector 401 software provides access to a set of transactions that can be used to interact with the TRM 10 either through a GUI-based application (e.g. a portal) that is used by the secured parties and their representatives, or through a system-to-system application.

High-Level Architecture

Figure 5A:
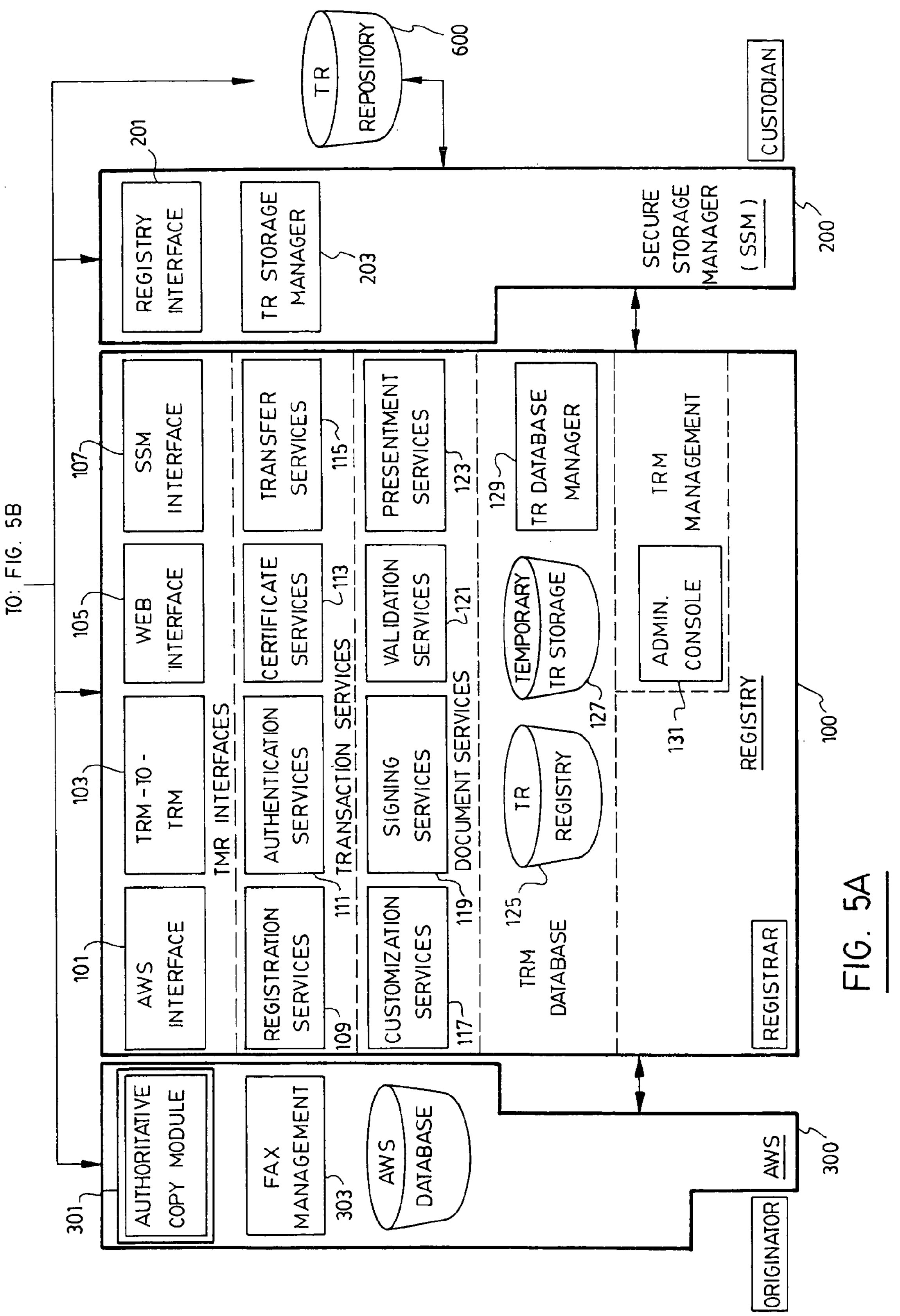
FIG. 5 is a diagram showing the basic architecture of a complete system, including a TRM according to a preferred embodiment of the invention.
Figure 5B:
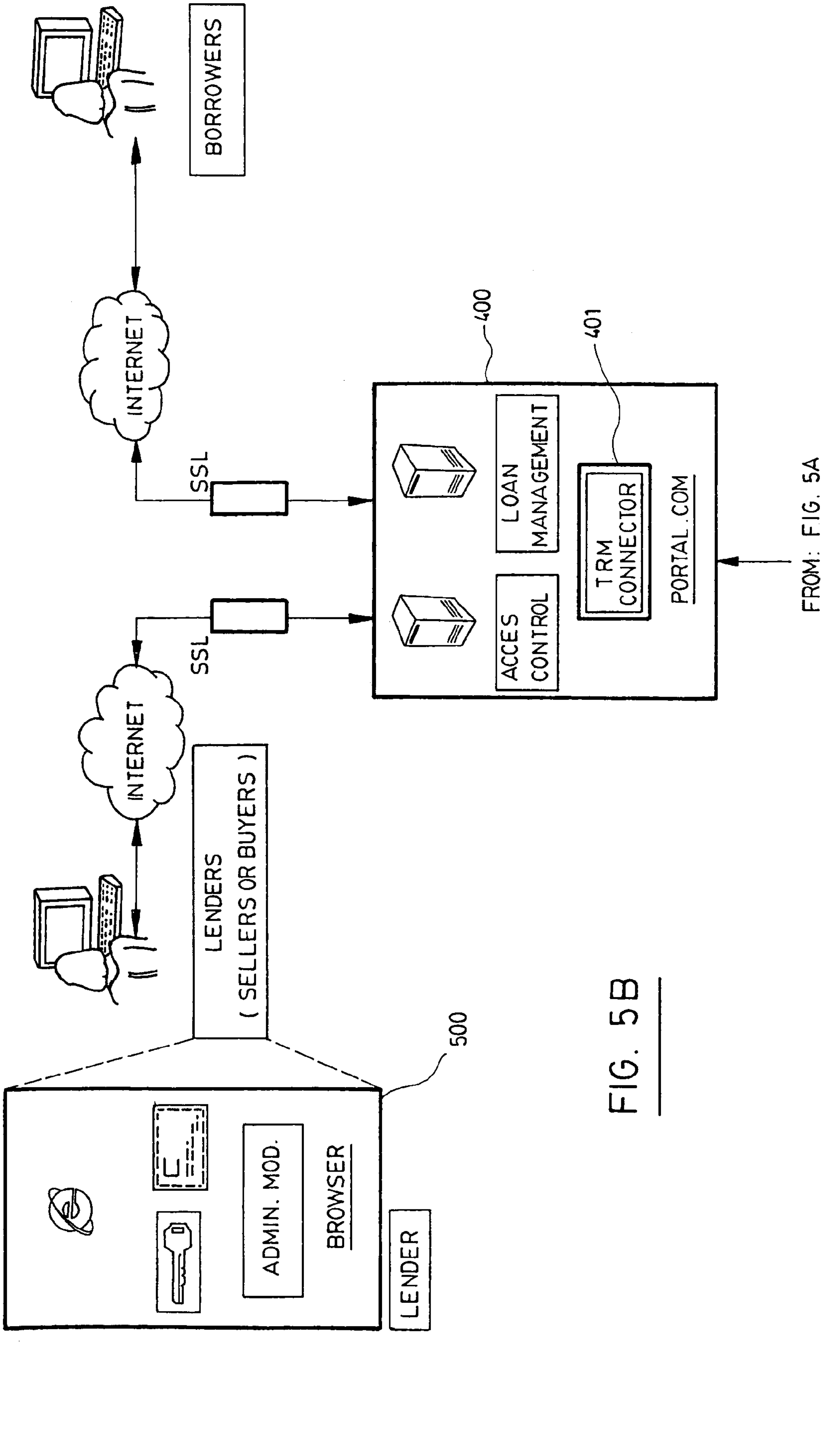

FIG. 5 depicts the high-level architecture of the TRM solution of the present invention. Registered and authorized users participate in TRM transactions using a Web browser 500 only. Access to the Registry 100 and the Secure Storage Manager 200 uses secure communications (SSL, Secure Sockets Layer) over the Internet. In a typical scenario, the parties operating the Registry 100 (i.e. the Registrar) or the Secure Storage Manager 200 (i.e. the Custodian) deploy a portal application 400 to securely control access to the TRM 10 and to integrate it with other business applications. The Portal 400 can serve as a front-end to Web-based services accessible by users or can use backend system-to-system functionality to access the TRM 10. FIG. 5 also shows how the ApproveIt® Web Server 300, as a registered and authorized participant in the TRM 10, is integrated into a total solution that includes borrowers who access the ApproveIt® Web Server 300 over secure Internet connections. Details on each element of the TRM 10 architecture are discussed later in this document.

The primary characteristics of the TRM 10 architecture are:

- A centralized Registry design to ensure the correctness and security of the electronic records relating to TRs. Storing all the TR Registry Records provides a simple approach for locating TRs and identifying their owners.
- A distributed design based on the Secure Storage Manager allows for multiple custodians to participate in the same TRM 10 deployment using the same Registry. The transfers of TRs among various custodians are significantly simplified because of the centralized design of the Registry.
- The TRM 10 architecture recognizes the fact that there will be more than one deployed registry and, hence, provides well-defined protocols that enable secure TRM 1 0-to-TRM 10 connectivity.
- Finally, and most importantly, the TRM 10 does NOT need the actual TR itself (e.g. the PDF document) to perform the transfer of ownership. This is a central feature since transfer transactions generally include thousands or tens of thousands of documents in each transaction. Having to open each TR (e.g. PDF document), extract and add information, and record the transfer would result in an extremely inefficient solution. The TRM 10 securely stores in the TR Registry all the information that is needed to execute a TR transfer and build the TR Chain of Ownership. This results in a scalable and responsive architecture. Optionally, the TRM 10 can embed all TR Chain of Ownership information in the TR if so required when transferring a particular TR out of the TRM 10.

Authoritative Copy of a TR

The U.S. laws applying to authoritative copies left the exact definition, implementation, and identification of The Authoritative Copy to technology providers. The ease with which electronic records can be identically copied makes it insufficient to identify The Authoritative Copy by only examining characteristics within the record itself. A secure external mechanism needs to be implemented to achieve a positive identification of The Authoritative Copy. This is what the TRM 10 does. In this document, within the context of the TRM 10, The Authoritative Copy is referred to as the Authoritative Copy.

The two primary functions of the Registry are to identify and locate the party in control of the The Authoritative Copy of a particular TR. Identifying the party in control of the The Authoritative Copy of a TR is straightforward. It can be easily done using data in the TR Registry of the TRM 10. The challenge is to identify the single Authoritative Copy among possibly many identical electronic copies of the TR since neither the TR nor its Authoritative Copy are stored in the Registry. This operation is more involved in a distributed design than in a centralized one where no document is permitted to leave the vault at all.

Elements of the Authoritative Copy

The Authoritative Copy is a virtual state of a particular TR whose validity and uniqueness are ensured by the TRM 10 based on data within the TR and on the relevant TR Registry Records that are associated with that particular TR. To determine the authoritativeness of a TR copy, a logical link must be established between that TR copy, the owners of that TR, and the TRM 10 with which the TR and its owner are registered. Therefore, The Authoritative Copy of a TR consists of the following elements:

- The “hash” of the TR and the unique ID that is assigned to that TR upon its initial registration with the TRM 10
- The Secure Storage Manager where the TR is stored and from where certification is sought
- The source of the TR’s provenance including the Secure Storage Manager and custodian ID
- The TR Chain of Ownership Certifying the Authoritative Copy The TRM 10 sets forth the following conditions that must be met in order to positively certify that a copy of a TR is indeed The Authoritative Copy of that TR:

- Condition 1: The TR has a unique ID assigned by the TRM 10 with which it is registered.
- Condition 2: The TR has not been modified or tampered with.
- Condition 3: The TR that is being presented for certification is stored at the same location that is accessible through the Secure Storage Manager that is recorded by the TR Registry.
- Condition 4: The party presenting the TR for certification as The Authoritative Copy is authorized to access the TRM 10.
- Condition 5: The party presenting the TR for certification is the actual current assignee (owner) of the TR, a trusted third-party acting on behalf of the current assignee, or an authorized designated representative of the current assignee.
- Condition 6: No other copy of that particular TR is being presented at the same time to the TRM 10 for validation or transfer.

The above strict conditions, executed based on a secure protocol, ensure that The single Authoritative Copy of a TR exists that is unique (conditions 3 and 5), identifiable (conditions 1 to 5), and unalterable (condition 4).

The TRM Approach vs. a Vault Approach

The design of the TRM 10 is superior to design approaches that rely on a centralized vault to guarantee that a document is unique, identifiable, and unalterable. The key differentiators of the TRM 10 approach include the following:

- The distributed design of the TRM 10 architecture enables a party to act as a Registrar, a Custodian, or both since roles of the Registrar and the Custodian are decoupled. In a centralized vault approach, the functions of the Registrar and the Custodian are intertwined—an organization wishing to be a Registrar is forced to also become a Custodian, and vice versa. The flexibility of the TRM 10 distributed architecture also allows a large lender to own the entire solution or a small lender to acquire Registry and Custodian services from third parties on an outsourced basis.

- Contrary to a system that is based on a centralized electronic vault where all TRs are stored, the TRM 10 does NOT store the actual TRs in the Registry but in any number of TR Repositories accessible through their respective Secure Storage Managers. Only data pertaining to the ownership history of a TR is stored as TR Registry Records in the TRM 10. This allows for many custodians to participate in the same TRM 10, served by one centralized Registry.
- With the TRM 10, a TR can exist outside the TRM 10 environment and can be used for informational purposes without forcing the user to always return to the centralized vault when access to that TR is needed. The design of the TRM 10 ensures that any such use of a TR outside the secure TRM 10 environment results in the TR being marked as a "Copy of an Authoritative Copy" or "Not an Authoritative Copy". The ability to view, store, and transmit a TR (e.g. a PDF document that represents a TR) without being tied to a vault provides significant flexibility and ease of use. Hence, requiring the user to always connect to a centralized vault to access the TR is very inefficient, significantly increases the complexity of the TRMS solution, and negates the benefits of electronic automation of business processes.
- The use of a centralized vault requires the use of an IT system that does not leverage the existing IT infrastructure. A centralized vault requires its own document management system and access control system. This results in duplicate systems being deployed since it is highly likely that a document management system and an access control system are already deployed. In contrast, the TRM 10 leverages the organization's existing document management system and access control system.

Meeting UCC 9-105 Legal Requirements

The Transferable Records Manager of the present invention complies with the legal requirements under UCC 9-105 specifying the six conditions for a secured party to have control of a TR if the TR is created, stored, and assigned in such a manner that:

"a single authoritative copy of the record or records exists which is unique, identifiable and, except as otherwise provided in paragraphs (4), (5) and (6), unalterable;"

The TRM 10 conditions described above for certifying a copy of a TR as the TRM 10 Authoritative Copy of that TR establishes compliance with this requirement where condition 1 ensures that it is unique and identifiable, while condition 2 detects if it has been altered. Furthermore, the data in the Registry identifies the location and current owner of The Authoritative Copy.

"the authoritative copy identifies the secured party as the assignee of the record or records;"

The secured party is identified in the e-contract as generated by the Approvelt® Web Server. Furthermore, conditions 3 and 4 ensure that the TRM 10 complies with this requirement by identifying the secured party as the assignee of The Authoritative Copy using the TR's unique ID and the TR Chain of Ownership, in addition to the assignee's Transfer Control Key, Transfer Control Certificate, and access control certificate.

"the authoritative copy is communicated to and maintained by the secured party or its designated custodian;"

Conditions 3, 4, and 5 ensure that the TRM 10 complies with this requirement by tracking the exact location where the TR is stored as indicated by the data in the Registry. The TRM 10 ensures that only the secured party or the designated custodian has access to maintain The Authoritative Copy using the TR Chain of Ownership and the secured party's or Custodian's Transfer Control Key, Transfer Control Certificate, and access control certificate.

"copies or revisions that add or change an identified assignee of the authoritative copy can be made only with the participation of the secured party;"

To add or change an identified assignee of The Authoritative Copy, the TRM 10 requires the participation and consent of the secured party as evidenced by the use of secured party's Transfer Control Key, Transfer Control Certificate, and access control certificate.

"each copy of the authoritative copy and any copy of a copy is readily identifiable as a copy that is not the authoritative copy; and"

If any of the conditions fails while attempting to identify a copy of a TR as The Authoritative Copy of that TR, the TRM 10 securely marks the copy as a "Copy of an Authoritative Copy" or "Not an Authoritative Copy".

"any revision of the authoritative copy is readily identifiable as an authorized or unauthorized revision."

The TRM 10 applies advanced cryptographic technologies to secure and identify The Authoritative Copy. Any unauthorized revision of the TR will invalidate the identification of The Authoritative Copy and render it useless. Any authorized revision done by the consent of the concerned parties is indicated as such using commercially available electronic signature technology.

TRM Key Features and Benefits

The present invention provides a secure TRMS solution that meets critical customer and market needs, enabling financial lending institutions and other organizations to reap significant business benefits including:

- The TRM 10 integrates with the commercially available Approvelt® web server.
- AWS customers can "bolt" the TRM 10 onto the deployed AWS system with relatively little effort.
- The TRM 10 is a secure and scalable closed registry system.
- The TRM 10 focuses on the control and transfer of ownership, not on the control and transfer of the actual document, resulting in a more efficient operating model that can process thousands or even tens of thousands of transfers in a relatively short time.
- e-Contracts do not have to be "locked up" in a centralized vault.
- The TRM 10 uses a distributed vault to securely store the e-contracts, where this vault can be hosted anywhere and by any party.
- The TRM 10 leverages the customer's existing infrastructure for storing documents (e.g. RDBMS, DMS, etc.).
- The TRM 10 enables flexible deployment models due to its distributed design.
- The TRM 10 provides business opportunities to interested parties that may not be possible with other solutions. A third-party can provide registrar services, custodian services, or both. A lender can be a registrar, a custodian, or both.

Access Control and Security

Access control and security are fundamental requirements for the TRM 10. The TRM 10 deploys several mechanisms to ensure both system-level security and transaction security. The design of the TRM 10 uses the following elements to deliver the required access control and security:

Access Control Certificates

All parties accessing TRM 10 must have access control certificates (X.509, v3). This is required for human users as well as machines such as the Secure Storage Manager and the ApproveIt® Web Server. The access control certificates can be issued either by the operator of the TRM 10 using trusted third-party products such as Netegrity or Oblix, or by trusted third-party service providers such as VeriSign.

TRM User Registration

All parties accessing TRM 10 must register as TRM 10 users. This is required for human users such as representatives of secured parties and system administrators, as well as machines such as the Secure Storage Manager and the ApproveIt® Web Server. The TRM 10 uses the access certificate to validate user identity in order to allow participation in TRM 10 transactions and to provide audit records asserting that a particular representative had executed a transaction on behalf of a secured party.

TRM Document Registration

All documents that are to become TRs controlled by the TRM 10 must be registered with the TRM 10.

Transfer Control Keys

The user's browser or system securely generates the private Transfer Control Key. The Transfer Control Key is then encrypted with the user's access control public key and is returned to TRM 10 for secure storage in the Registry. Subsequently, the encrypted Transfer Control Key is securely delivered to the party (human or machine) that will use it. Once downloaded, the Transfer Control Key is kept only in volatile computer memory—not stored anywhere on disk. The Transfer Control Key is decrypted with the user's access control private key while in volatile memory, used to sign a TRM 10 transaction, and then destroyed.

Note that Transfer Control Keys are used to sign transfer transactions. Access control keys, on the other hand, are used to sign all communications between system components and to encrypt/decrypt the Transfer Control Key.

Transfer Control Certificates

The TRM 10 issues a Transfer Control Certificate to each party accessing TRM 10. The TRM 10 manages these certificates throughout their life cycle, acting as a limited certificate services provider. Each Transfer Control Certificate includes the public key counterpart to the Transfer Control Key.

Secure Communications

All communications with the TRM 10 occur over secure communication lines using the encryption and security capabilities of the Internet standard Secure Sockets Layer (SSL) protocol.

Hardware Security Appliances (Optional)

For added security, the TRM 10 is designed to use state-of-the-art hardware security appliances such as Chrysalis or Ncipher for securely generating, managing, storing, retrieving, and recovering TRM root keys and Transfer Control Keys. These appliances can further provide performance, scalability, and fault-tolerance capabilities. Finally, hardware security devices can also be used for signing and time-stamping transactions.

System-Level Security

The TRM 10 is a central point in establishing a Secure TRM Environment for conducting TR transactions using a combination of:

A secure ApproveIt® Web Server

A secure Registry and Secure Storage Manager

A secure buyer/seller access channel to the TRM 10

A secure communications channel among all participating systems (ApproveIt® Web Server, Registry, Secure Storage Manager, and Portal application)

A secure communications channel to other TRMs (if needed)

A secure communications channel to other ApproveIt® Web Servers (if needed)

The TRM 10 protects its records of ownership from the moment they are created until they expire. All communication and exchanges among parties within the Secure TRM Environment occur over SSL. Transactions are further secured based on mutual authentication protocols using Transfer Control Keys and Transfer Control Certificates. Once created, TRs remain "bound" to their original Secure TRM Environment. Even though the TRM 10 allows TRs to physically reside in any document management system outside the TRM 10, special secure mechanisms based on Transfer Control Keys and Transfer Control Certificates guarantee that any TR transfer is performed only within the Secure TRM Environment. Conversely, the Secure TRM Environment also guarantees that non-authoritative copies of TRs that exist outside the Secure TRM Environment are distinctly watermarked as such. This enables the TRM 10 to guarantee the integrity and safekeeping of TRs from unauthorized use, to detect any tampering with TRs, and to provide actual proof of TR ownership.

Transaction Security

Figure 6:
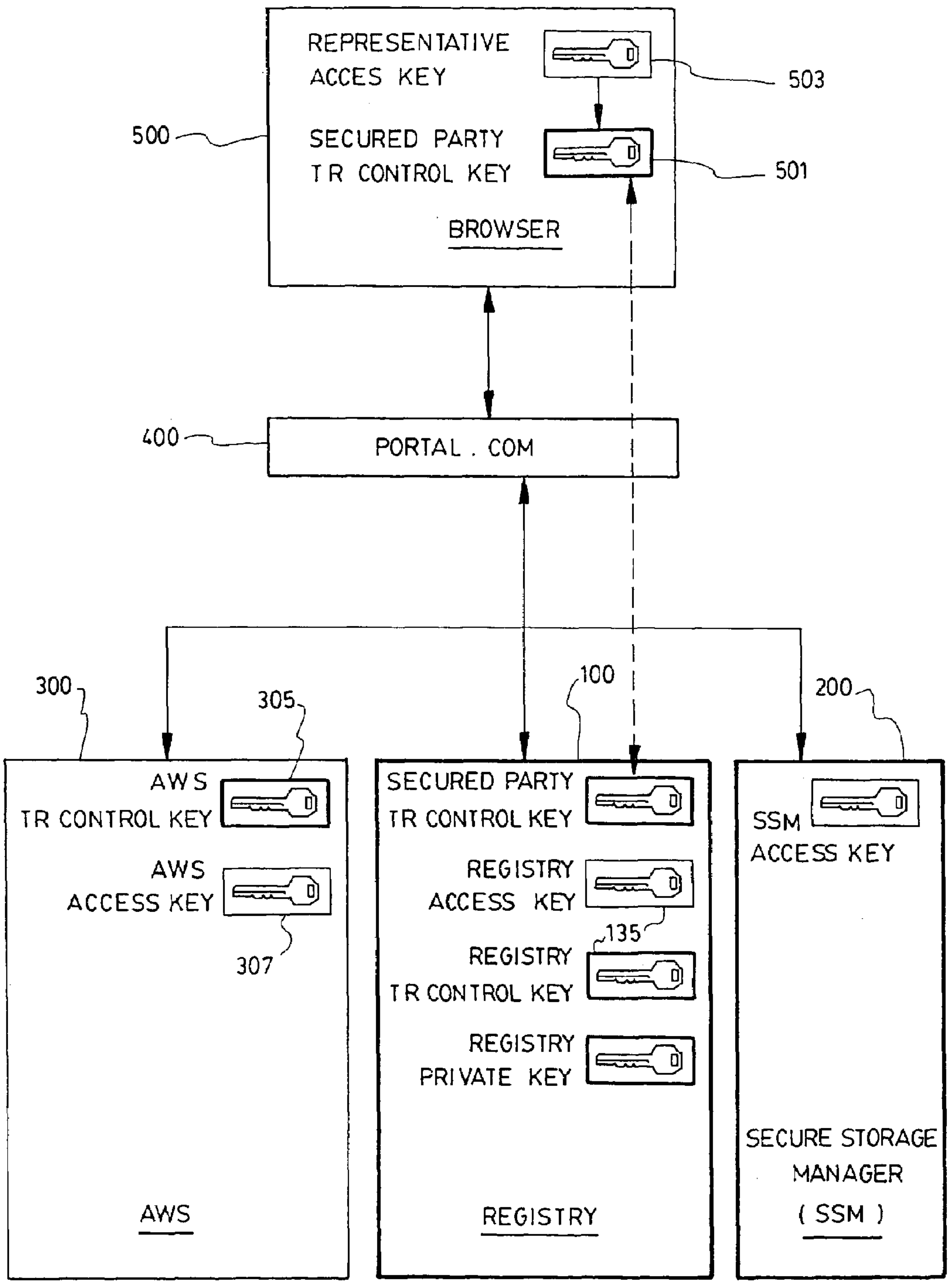
FIG. 6 is a diagram showing the security measures in place for insuring integrity of the system of the present invention.

FIG. 6 depicts the key elements that ensure the security of the TRM 10. The private keys depicted in FIG. 6 are fundamental to the secure operation of the TRM 10. The Transfer Control Keys 501, 305 and 133 are private keys that are securely generated by representative's browser or system. They are used to sign the transfer transactions at each step of the way. The access control keys 503, 305, 135 are private keys that are securely generated by an external access control system. They are used to sign, encrypt, and decrypt all communications, as well as for representative authentication.

As mentioned earlier, all users must register with the TRM 10 in order to participate in any TRM 10 transaction. This registration process requires the representative of the secured party to have an access control certificate. Once registered, and using a Web browser only, the representative can now access the TRM 10 by interacting with the portal application. Using the TRM Connector, the portal application interacts with the TRM in order to authenticate the user. Once authenticated, the TRM 10 uses the representative's access certificate and access private key to securely access the TR Certificate and Transfer Control Key in order to execute a TRM 10 transaction.

Other Security

In addition to access control, system level, and transfer transaction security, TRM also provides audit trail, document, and approval security. The audit trail security proves that a particular transaction took place and asserts the participants in that transaction. Document security ensures that TRs are not tampered with, enabling detection if tampering occurs. Finally, approval security ensures that the approval itself cannot be tampered with without detection.

TR Transfer Processes

The TRM 10 addresses various types of transfer processes that are an integral part of the business processes of lending organizations. The TR transfer process is basically an endorsement process that allows a seller of a TR to show her/his consent to transfer and to authenticate the assignment of ownership to the buyer.

This section presents the types and examples of TR transfer processes as they relate to business processes. It also describes two transaction scenarios: validating The Authoritative Copy and transferring ownership of The Authoritative Copy from seller to buyer.

Types of TR Transfer Processes

In a given transfer, there are potentially three parties involved: the owner of the TR, the registrar with which the TR is registered, and the custodian who is storing the TR on behalf of the owner.

Table 2 lists the types of transfer processes. The Owner can be a lender or an investor. The Registrar is the party who is operating the TRM Registry. The Custodian is the party who is in charge of storing the actual TRs in the TR Repository on behalf of the owner using the Secure Storage Manager. Note that all Registrar or Custodian changes require the exchange of information and records among the impacted TRM systems.

TABLE 2

Types of TR Transfer Processes

| TRM Transfer Transaction | TRM Owner | TRM Registrar | TRM Custodian |
|---|---|---|---|
| Transfer In<br>This is the initial transaction where an electronically-signed TR is sent from an originating system (likely AWS) to be registered as an Authoritative Copy for the first time with TRM. This is an important transfer transaction since it completes the creation of the Authoritative Copy for that TR as initiated by an originating system like AWS. | New | New | New |
| Transfer Ownership<br>This transaction represents a Secured Party transferring the ownership of the Authoritative Copy to another Secured Party without changing the Registry controlling the Authoritative Copy or the secure storage location of the Authoritative Copy. This is the most common type of transfer transaction where ownership changes but the registrar and custodian remain unchanged. It is essential in the sale or securitization of the loan or lease associated with the Authoritative Copy.<br>This is an intra-registrar, intra-custodian transfer. | Changes | Same | Same |
| Transfer Registry<br>This transaction represents a Secured Party transferring control of the Authoritative Copy to another TRM Registry. This transfer does not change ownership (assignment) or location of custody. This is an infrequent transaction that is required if the Secured Party decides not to use the current Registry (e.g. a competitor started to use this Registry).<br>This is an inter-registrar, intra-custodian transfer. | Same | Changes | Same |
| Transfer Custody<br>This transaction represents a Secured Party transferring the custody of the Authoritative Copy to another storage location without changing ownership (the assignee) of the Authoritative Copy or the Registry controlling the Authoritative Copy.<br>This transaction is used when a new assignee wants to store Authoritative Copies of TRs with a different custodian. The new custodian has a different secure storage location but uses the same Registry as the previous custodian to control the Authoritative Copies.<br>This is an intra-registrar, inter-custodian transfer. | Same | Same | Changes |
| Transfer Ownership & Registry<br>This is a composite transaction that assigns ownership to another Secured Party while changing the Registry controlling the Authoritative Copy. The secure storage location of the Authoritative Copy remains the same.<br>This is an inter-registrar, intra-custodian transfer. | Changes | Changes | Same |
| Transfer Ownership & Custody<br>This is a composite transaction that assigns ownership to another Secured Party while moving the Authoritative Copy to another secure storage location. The Registry controlling the Authoritative Copy remains the same.<br>This is an intra-registrar, inter-custodian transfer. | Changes | Same | Changes |
| Transfer Registry & Custody<br>This is a composite transaction that changes the Registry controlling the Authoritative Copy while moving the Authoritative Copy to another secure storage location. Ownership assignment remains the same.<br>This is an inter-registrar, inter-custodian transfer. | Same | Changes | Changes |
| Transfer Ownership & Registrv & Custody<br>This is a composite transaction that assigns ownership to another Secured Party while changing the Registry controlling the Authoritative Copy and moving the Authoritative Copy to another secure storage location.<br>The new owner also wants to change registrars and custodians. This is an inter-registrar, inter-custodian transfer. | Changes | Changes | Changes |
| Transfer End<br>This transfer transaction is used when the term of the Authoritative Copy has ended and no longer requires to be legally controlled by the TRM Registry. An example is when a loan is paid off (either early or at term) and the Authoritative Copy ceases to be effective. | End | End | End |
| Transfer Out<br>This transaction represents a Secured Party moving the Authoritative Copy out of the control of the TRM Registry to a non-TRM-based system. This transaction is used when an Authoritative Copy is transferred to a Registrar or a Custodian that is not using TRM. An example is when loans are in default or the documentation is found to be defective and needs to be returned to the originating lender.<br>When a Transfer Out occurs, the details of the transfer are recorded in the TRM Registry and marked as transferred out. The result in the TRM Registry is similar to a Transfer End. | Same or Changes | None | None |

TABLE 2-continued

Types of TR Transfer Processes

| TRM Transfer Transaction | TRM Owner | TRM Registrar | TRM Custodian |
|---|---|---|---|
| Transfer to Paper This is a special case of Transfer Out where the Authoritative Copy is converted to a paper original and the electronic Authoritative Copy ceases to exist. (Note: there is no concept of a paper authoritative copy). A special process to convert the Authoritative Copy to a paper original requires a secure printing of the Authoritative Copy with prior transactions listed and a final wet-ink endorsement by the assignee. This process will be useful when transferring assignment and custody to a party who cannot or will not access TRM. | Same or Changes | None | None |

Examples of TR Transfer Processes

Table 3 provides examples of transfer processes that are associated with various business processes where TRs are required. In addition to this list, there are other business processes that have specialized transfer processes. These business processes include:

Transfer Out
Spot delivery
Loan documentation review, approval, and booking
Trailing documents: matching and review
Auditing
Batch processing for custodial services

TABLE 3

Examples of TR Transfer Processes

| Business Process | Transfer Process |
|---|---|
| Assign from dealer to lender | Dealer to Lender |
| Other transfers | Closing to Lender, Lender to Secondary, Secondary to Market, and Market to Market |
| Store authoritative copy with trustee department or custodian | Internal or Lender to Custodian |
| Securitization assignment to investors | Internal Custodial via Pool |
| Transfer Out: Back out, buy back | Lender to Dealer |
| Transfer Out: Paid off | Lender Destroys |
| Swap (buy back and replace in pool) | Lender to Dealer, internal |

There are four phases in which control of the TR must be maintained in accordance to UCC 9-105:

Initially, e-contracts are created on a lender's system (or on a system authorized by the lender), which incorporates the ApproveIt® Web Server for signing these contracts. At this point, signed contracts are not yet authoritative copies. In order for these contracts to become authoritative copies, a Secure TRM Environment must be used. The TRM 10 converts the contracts to authoritative copies, groups them into a collection or pool if required, attaches images of the ancillary documents, and transmits them to the document repository. The TRM 10 also guarantees that each Authoritative Copy of the TR is unique and unaltered, identifies the lender as the sole assignee, and guarantees that the TR has been transferred to its rightful owner. In this phase, the first assignment of ownership occurs automatically through the collaboration of the TRM 10 and the Authoritative Copy Module of the ApproveIt® Web Server.

For subsequent transfers of ownership from one lender or investor (current assignee or seller) to another (buyer) the original TRM 10 with which the TRs are registered must be used. The TRM 10 makes certain that the TR is unique, identifiable as being assigned to the lender as the first owner, that it has remained unaltered, and that it has been transferred to its present rightful owner. In addition, the transfer can only take place with the consent of the seller, a concern that was not as important during the first transfer but is of utmost importance for subsequent ones. In this phase, the TRM 10 provides secure transfer processes to ensure that control of the Authoritative Copy of that TR is maintained in accordance to UCC 9-105.

Should the present rightful owner decide to trust a different custodian who uses another TRM 10 to store and maintain the authoritative copies that s/he owns, a transfer that does not involve a buyer and a seller will have to take place between two TRMs. Even during this type of transfer, the present owner must maintain control of the TRs in accordance to UCC 9-105.

Users may query the TRM 10 about the content or status of a TR as well as perform batching actions on existing TRs. While verifications of TRs take place implicitly and in the background, viewers may explicitly request that the audit trail of a particular TR is verified and presented on the screen.

To understand how one interacts with this Secure TRM 10 Environment, two scenarios are explored next: validating The Authoritative Copy and transferring ownership from seller to buyer.

Scenario 1—Validating the Authoritative Copy

The holder engages in the following process in order to validate that a particular TR copy is The Authoritative Copy:

The TR holder logs into the TRM 10 over a secure communications link. A successful login indicates that the TR holder is authorized to access the TRM 10.

The TR holder presents her Transfer Control Certificate to prove that she is the owner of that particular TR. The TRM 10 certifies the six conditions mentioned above. If these conditions are met, the TRM 10 notifies the holder that this TR copy is The Authoritative Copy. Otherwise, the TR is clearly marked as a "Copy of an Authoritative Copy" using a visible watermark. A print-only watermark can also be included.

Note that the authoritative copy never leaves the SSM (vault). The TRM presents a rendered view of the TR but only for the authorized Secured Party (owner or assignee). The appearance of the TR will depend on the party requesting it. The TRM indicates that it is an "Authoritative Copy" when presented to the owner and "Non Authoritative Copy" when presented to the assignee.

Scenario 2—Transferring Ownership from Seller to Buyer

A TR owner engages in the following process in order to sell a particular TR to a buyer:

The seller (i.e. current assigned or owner) logs into the TRM 10 with a Web browser over a secure communications link. A successful login using her TR Access Certificate indicates that the seller is authorized to access the TRM 10. The TRM 10 then presents a list of TRs that are owned by the seller as determined from the TR Registry Records.

The seller selects that particular TR that she wants to transfer and identifies the buyer from a list of authorized participants that are registered in the TRM 10.

The seller then initiates the transfer process. This triggers an alert to the designated buyer indicating that a TR transaction is pending. To reach this point of the process, the TRM 10 would have certified that the conditions set forth previously are satisfied. This ensures that the seller has the right to transfer this TR based on the Transfer Control Certificate.

At a later time, the buyer logs into the TRM 10 using a Web browser over a secure communications link. A successful login indicates that the buyer is authorized to access the TRM 10 and that his private and secure identification credentials do identify him as a registered TRM buyer.

The buyer then accepts the transfer. The TRM 10 completes the transfer of ownership of that TR. As before, to get to this point of the process, the TRM 10 would have certified that the conditions set forth are satisfied. This ensures that the buyer of the TR has now control over The Authoritative Copy.

Based on the above strict process, it is impossible for anyone—even the TR owner—to sell the same transferable record to more than one buyer using identical copies of that TR. Even if the seller attempts to do so, the moment the buyer accepts the transfer of ownership from the seller, the TRM 10 marks that TR as being owned by the buyer. If the previous owner attempts to transfer a copy of that TR, the TRM 10 asserts that she is not the owner of The Authoritative Copy.

Deployment Models

Figure 7:
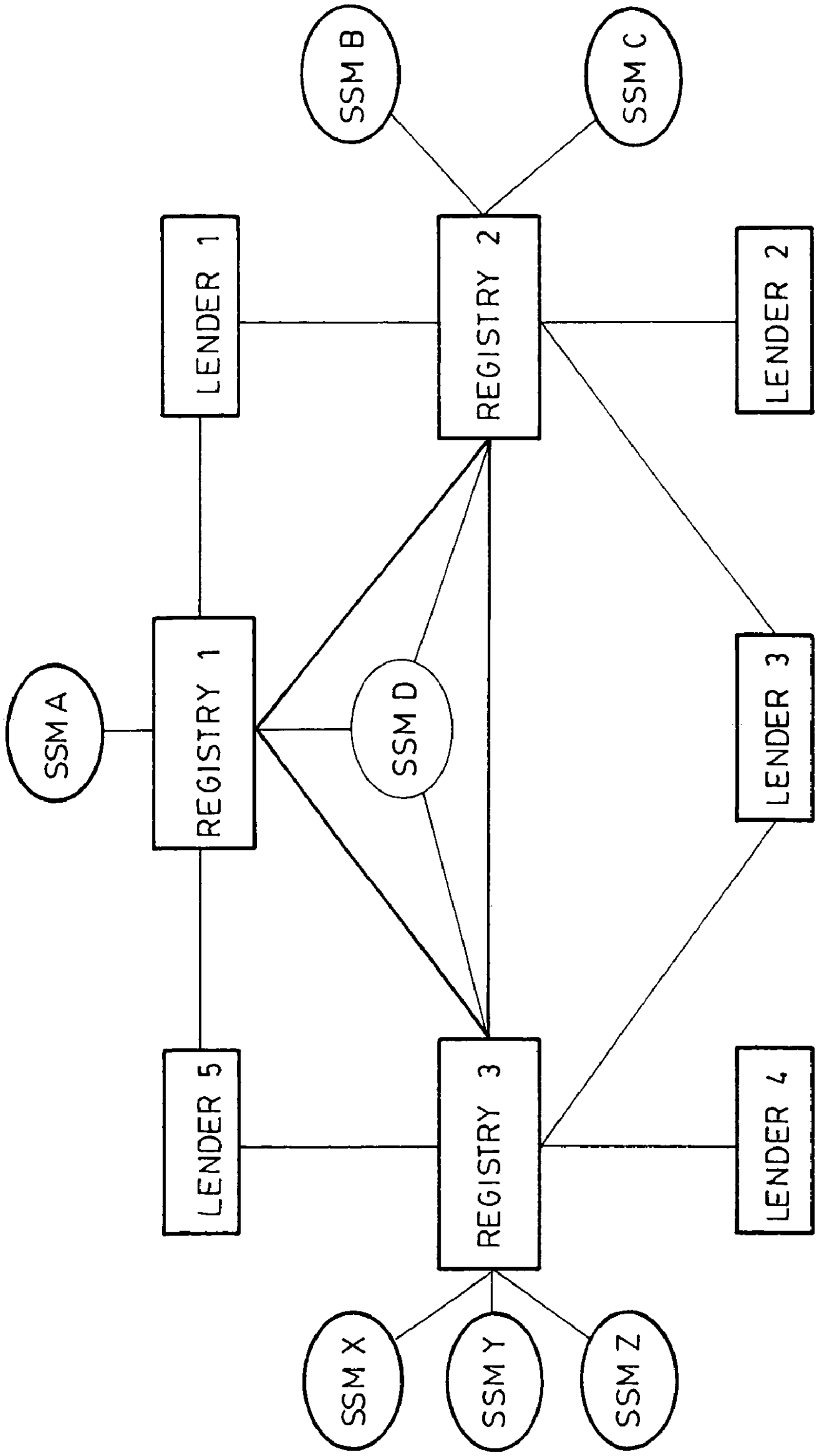
FIG. 7 is an example of a deployment model according to one embodiment of the invention.

FIG. 7 depicts the various possible deployment models that can be used to implement the TR transfer processes discussed. The flexibility of the TRM 10 design enables various business relationships among Lenders, Registrars, and Custodians.

TRM Functional Modules

The TRM 10 provides a highly reliable, available, scalable, and secure TRMS solution. The main functional modules of the TRM 10 are depicted in FIG. 5.

Approvelt Web Server (AWS)

The Approvelt® Web Server collaborates closely with the TRM 10 to register and generate Authoritative Copies of TRs. The TRM 10 securitizes TRM-ready e-contracts that it receives from one or more Approvelt® Web Servers. In order to prepare and transmit these documents, the Approvelt® Web Server makes use of several modules, which are described next.

It should be understood that although a preferred embodiment has been described herein with reference to the Approvelt® Web Server, other equivalent systems may be used, and the invention does not lie therein. The invention lies in the TRM 10 which is adapted to uniquely identify a transferable document, and to effect transfers thereof.

Authoritative Copy Module

The Approvelt® Web Server uses the Authoritative Copy Module 301 to register an e-contract with the TRM 10 by receiving a unique ID from the TRM 10 and embedding it into the e-contract. The Authoritative Copy Module 301 is also responsible for establishing a secure and trusted protocol that enables the TRM 10 to communicate with the Approvelt® Web Server 300. The Approvelt® Web Server uses this protocol to transmit or present the prepared documents and accompanying ancillary documents to the TRM 10.

The Authoritative Copy Module 301 is also responsible for the destruction of the e-contracts after they have been successfully transferred to the TRM 10. In the case that a contract is returned back to a dealer, the Authoritative Copy Module 301 receives the e-contracts and reassigns them for securitization by another lender. Note that, although in some cases the actual documents are transmitted to the TRM 10, these documents are only placed there temporarily for the purpose of completing a specific transfer process.

Fax Management

Although this is not required for the operation of the TRM 10, the Approvelt® Web Server uses the Fax Management 303 to scan ancillary paper documents and associate them with an e-contract using the barcodes found on the paper documents.

Transferable Records Manager—Registry

The TRM 10 implements a number of modules specifically designed to create, modify, and maintain TRs in a secure manner and in accordance with UCC 9-105 regulations. It is organized in four layers: TRM Interfaces, TRM Services, TRM Storage, and TRM Management.

TRM Interfaces

The TRM 10 provides a set of interfaces to securely communicate with the various components that are present in a deployed solution. These interfaces use certificate-based authentication mechanisms to guarantee safe, secure, and trusted communications with the TRM 10.

AWS Interface

The AWS Interface 101 is responsible for establishing secure communications with one or more Approvelt® Web Servers.

Secure Storage Manager Interface

The Secure Storage Manager Interface 103 is responsible for establishing secure communications with one or more Secure Storage Managers.

Web Interface

The Web Interface 105 is responsible for establishing secure communications with one or more portal applications, systems, and Web browsers.

TRM-to-TRM

The TRM-to-TRM Interface 107 is responsible for establishing secure communications between various TRM 10 systems.

TRM Transaction Services

The TRM 10 provides an integrated set of services that enable it to securely execute TRM transactions.

Registration Services

Registration Services 109 provide user, system, and document registration. All users, systems, and documents that need to take part in TRM transactions must be registered with the TRM 10.

Authentication Services

Authentication Services 111 facilitate user and system authentication when requesting access to the TRM 10.

Certificate Services

Certificate Services 113 issue Transfer Control Certificates to users and systems participating in TRM transactions. All requests for certificates are thoroughly checked out before the TRM 10 awards them. Using their Transfer Control Certificates, representatives of secured parties can access the TRM 10 from anywhere on the Internet using only a Web browser.

Transfer Services

Transaction Services 115 manage all TRM 10 transfer transactions. They implement the required transaction logic to comply with the legal requirements of UCC 9-105, resulting in legally enforceable transfer processes.

TRM Document Services

The TRM 10 provides an integrated set of secure document services in support of TRM transactions. The document services consist of customization, signing, validation, and presentment services.

Customization Services

Customization Services 117 are used to insert in the e-contract (received from the ApproveIt® Web Server) the required watermarks, unique TRM ID, and other information necessary to register a TR with the TRM 10.

Signing Services

Signing Services 119 are responsible for electronically signing the transfer transactions using the Transfer Control Keys, providing transaction integrity and non-repudiation. They are also used to sign an e-contract after its customizations to attest that the changes were made under the secure control of the TRM 10.

Validation Services

Validation Services 121 are responsible for verifying the authenticity of each transfer transaction and TR. They are also used to extract TR Transaction Evidence and construct the TR Chain of Ownership for an Authoritative Copy of a particular TR, serving as a secure audit trail history of ownership.

Presentment Services

Presentment Services 123 are used to display The Authoritative Copy in a Web browser based on the conditions listed above. They also participate in implementing the "Transfer Out" functionality where The Authoritative Copy of a particular TR is converted from electronic form to paper chattel paper based on several formats including paper, active PDF file, inactive ("flattened") PDF file, GIF, and TIFF. The transfer out transaction is included in the TR Chain of Ownership.

Note that if The Authoritative Copy is transferred out to paper, the TRM 10 will logically transfer the contract out of its system so that no electronic copy of the contract can be recognized as THE Authoritative Copy. Furthermore, the paper copy indicates that it was transferred from an electronic Authoritative Copy and should be endorsed by the assignee.

TRM Database

TR Registry

The TR Registry is a database 125 that holds the transfer information for all the TRs registered with the TRM 10. All information pertinent to transfers of ownership is kept in the TR Registry database so that a complete trace of all transfer transactions can be built at all times.

Temporary TR Storage

The Temporary TR Storage 127 is responsible for temporarily storing TRs if needed during the transfer of ownership or any other activities performed by the TRM 10. As discussed previously, the Secure Storage Manager is responsible for permanently storing the TRs in the TR Repository.

TR Storage Manager

The TR Storage Manager 129 is responsible for managing the TR Registry database and the Temporary TR Storage. It also provides an interface for transmitting TRs from the TRM 10 to the TR Repository through the Secure Storage Manager, in addition to the controlled transfer to output devices such as tape and CD. The TR Database Manager is also used when a transfer transaction requires the transfer of the TR from one TR Repository to another.

TRM Management

TRM Management is responsible for managing all aspects of the TRM 10.

Administration Console

The Administration Console 131 provides a Web-based graphical interface for managing all aspects of the TRM 10 including user enrollment and system administration.

Administration Module

The Administration Module enables the administrator of a Secured party to enroll its Representatives in TRM using a Web browser. It also securely allows the creation and encryption of the Transfer Control Keys.

Creating the Transfer Control Key for a Secured Party

An Administrator installs the Administration Module and uses a browser to initiate the process. The Administrator provides his access control certificate. The Administration Module automatically does the following: asks the browser to generate a key pair (this is the Transfer Control Key pair); encrypts the private part of the Transfer Control Key using the public part of the Administrator's access control key; sends the encrypted key to the TRM Registry for secure storage.

Throughout the above process, the TRM does not see the private part of the Transfer Control Key in the clear. This ensures that only the Secured Party ever has access to it in the clear. Also, the invention never stores the private part of the Transfer Control Key in persistent storage.

Encrypting the Transfer Control Key for use by a Secured Party's Representative (This assumes that the Administrator already installed the Administration Module and will be using a browser).

The Administrator receives the Representative's access control certificate and uses the Administration Module to automatically start the following sequence: retrieve the encrypted private part of the Secured Party's Transfer Control Key from the TRM Registry; decrypt the private part of the Transfer Control Key using the private part of the Administrator's access control key; encrypt the private part of the Transfer Control Key using the public part of the Representative's access control key; send the encrypted key to the TRM Registry for secure storage.

Now, the encrypted private part of the Secured Party's Transfer Control Key is stored twice in the TRM Registry: the first is encrypted with the public part of the Administrator's access control key and the second is encrypted with the public part of the Representative's access control key. This process can be repeated, as many times as needed once for each Representative that needs to be registered with the TRM. As before, throughout the above process, the TRM does not see the private part of the Transfer Control Key in the clear in order to ensure that only the Secured Party ever has access to it in the clear. Also, the invention never stores the private part of the Transfer Control Key in persistent storage.

Transferable Records Manager—Secure Storage Manager

The TRM 10 allows authoritative copies to be physically stored in TR Repository locations that are separate from the physical location of the Registry. This enables one or more interested parties to play the role of Custodian.

Registry Interface

The Registry Interface 201 is responsible for establishing secure communications with one or more Registries. It uses certificate-based authentication mechanisms to guarantee safe, secure, and trusted communications between TRM Registries and Secure Storage Managers.

TR Repository Manager

The TR Repository Manager 203 performs the necessary functions to store and retrieve TRs from a TR Repository 600. The database implementing the TR Repository must have a certificate-based interface to the TRM 10.

Transferable Records Manager—TRM Connector

The TRM Connector 401 provides the necessary secure communications and protocol for third-party applications and systems to integrate with the TRM 10. In a typical deployment scenario, the TRM Connector is installed at the portal that is used to access the TRM 10.

In summary, the present invention can create Transferable Records; present and review Transferable Records; verify the ownership of an Authoritative Copy for a particular Transferable Record; transfer the ownership of an Authoritative Copy of a particular Transferable Record to another party and provide evidence of the chain of ownership of an Authoritative Copy for a particular Transferable Record.

The system of the present invention can have one or more registries, one or more vaults, and one or more secured parties with each secured party having one or more representatives.

The system of the present invention can interact with one or more originating systems such as the ApproveIt® Web Server (AWS) using the an Authoritative Copy Module for creating authoritative copies out of contracts signed by AWS. It can also accept authoritative copies by "uploading" them to it.

For security, all access control certificates are registered with the TRM before being used. Also, all "users" are registered: secured parties, representatives of secured parties, documents, secure storage managers (vaults), originating systems such as AWS, and any portal application that will integrate the TRM into it.

The TRM can also use hardware-based security devices.

The TRM advantageously has multiple levels of security: access control security, transfer control security, audit trail security, document security, and approval security. All these levels of security use cryptography to ensure integrity and non-repudiation.

Access control security strictly controls access using standard X509 v3 certificates issued by any third party product.

Transfer control security strictly controls participation in TRM transfer transactions to those who have Transfer Control Certificates and transfer Control Keys that are issued by the TRM, not by third-party vendors.

An audit trail security strictly controls the record of each TRM transfer transaction in order to prove that a particular transaction took place and assert the participants in that transaction.

Document security strictly controls the TR document preferably using Silanis Technology Inc.'s ApproveIt® technology to ensure that TRs are not tampered with and to detect when tampering occurs. This way, TRs cannot be altered without detection or authorization. In addition, secure watermark technology assures that a non-authoritative copy is always obvious and cannot be altered without invalidating the TR.

Approval security strictly controls the approval itself so that it cannot be tampered with without detection.

Of course, numerous changes could be made to the preferred embodiments disclosed hereinabove without departing from the scope of the invention as defined in the appended claims.

The invention claimed is:

1. A system for securely vaulting, auditing, controlling and transferring electronic transferable records (TRs) with unique ownership, said electronic transferable record having been created with a secure document creation system, wherein said system comprises:

at least one registry for registering said electronic transferable record with unique ownership in a TR registry record;

at least one secure storage manager associated with said registry, said Secure-Storage Manager (SSM) storing said transferable record registered in said registry as an authoritative copy, said secure storage manager being distinct from said registry;

means for registering participants with said system, said participants including said registry, said SSM and a plurality of secured parties, each of said secured parties being represented by at least one representative, each of said participants being provided with an access key pair;

wherein said transferable record can be transferred in a transaction between an originating party and a receiving party with a transaction descriptor, said transaction descriptor including information about the parties involved in said transaction and an identification of said TR being transferred, said transaction descriptor being initially signed by said originating party with said TR, subsequently verified and countersigned by said registry and signed by said accepting party, said transaction descriptor, upon completion of said transaction, being stored in said TR registry record, an owner of a TR, being the only party authorized by said registry to transfer a document;

wherein said system is adapted to display a rendered view of said TR, said TR being identified as said authoritative copy of said TR only when rendered to said owner accessing said TR in said SSM through said system, and said TR being otherwise identified as not being said authoritative copy;

wherein said authoritative copy of a TR includes:

a hash of the transferable record and the unique ID that is assigned to that TR upon its initial registration with said system;

an indication of a Secure Storage Manager where the TR is stored;

a source of the provenance of said TR including said Secure Storage Manager and a custodian ID; and a TR Chain of Ownership, represented by an up-to-date TR registry record.

2. A system according to claim 1, wherein said system further includes means for uniquely and securely identifying said participants, said means including a Transfer Control Key pair and a Transfer Control Certificate.

3. A system according to claim 2, wherein said Transfer Control Key is a private key and said Transfer Control Certificate includes a public key, and wherein information relating to said party is associated and made part of said Transfer Control Certificate, and said private key and said public key form a cryptographic key pair.

4. A system according to claim 1, wherein said TR registry record includes a TR transaction evidence for each transaction.

5. A system according to claim 1, wherein said system further includes an interface for permitting secured parties to transfer, view, verify, control, transferable records that they own.

6. A system according to claim 1, wherein critical information exchanged between said registry, said secure storage manager and said secured parties is encrypted.

7. A system according to claim 6, wherein said information exchanged between said registry, said secure storage manager and said secured parties is exchanged electronically using SSL.

8. A system according to claim 1, wherein said transaction includes transfer in; transfer ownership; transfer registry; transfer custody; transfer ownership and registry; transfer ownership and custody; transfer registry and custody; transfer ownership, registry and custody; transfer end; transfer out; and transfer to paper.

9. A system according to claim 3, wherein said private part of the Transfer Control Key is encrypted with a representative access key and stored in said registry.

10. A system according to claim 4, wherein said TR transaction evidence includes type and status of transactions such as a TR origination evidence; a TR transfer evidence and a TR transfer pending evidence.

11. A system according to claim 1, wherein said TR chain of ownership is constructed with all TR transaction evidence records and stored in said registry.

12. A system according to claim 1, wherein said secured parties communicate with said system through a portal.

13. A system according to claim 1, wherein an owner of a TR is the only person authorized by said registry to transfer a document, said owner being identified by the TR control key of said owner, compared with data in said transaction record.

14. A system according to claim 1, wherein said system is further adapted to verify an ownership of said authoritative copy for a selected TR.

15. A system according to claim 1, wherein said system includes a plurality of said at least one registry and a plurality of said at least one secure storage manager.

16. A system according to claim 1, wherein said transaction descriptor uses a nested hierarchical structure.

17. A system according to claim 1, wherein said registry includes an administration module.

* * * * *